(12) United States Patent
Meppelink et al.

(10) Patent No.: US 9,612,039 B2
(45) Date of Patent: Apr. 4, 2017

(54) MOBILE SOLAR POWER RACK

(71) Applicant: Mobile Grid, LLC, Houston, TX (US)

(72) Inventors: Joseph Meppelink, Houston, TX (US);
Andrew Vrana, Houston, TX (US);
Joseph Romano, Houston, TX (US)

(73) Assignee: Mobile Grid, LLC, Houston, TX (US)

( * ) Notice: Subject to any disclaimer, the term of this patent is extended or adjusted under 35 U.S.C. 154(b) by 0 days.

(21) Appl. No.: 14/275,686

(22) Filed: May 12, 2014

(65) Prior Publication Data

US 2015/0013750 A1   Jan. 15, 2015

Related U.S. Application Data

(60) Provisional application No. 61/823,019, filed on May 14, 2013.

(51) Int. Cl.
| | |
|---|---|
| *H01L 31/045* | (2006.01) |
| *H01L 31/042* | (2014.01) |
| *F24J 2/38* | (2014.01) |
| *F24J 2/52* | (2006.01) |
| *H02S 20/30* | (2014.01) |
| *F24J 2/54* | (2006.01) |
| *H02S 30/20* | (2014.01) |

(52) U.S. Cl.
CPC ........... *F24J 2/5264* (2013.01); *F24J 2/5233* (2013.01); *F24J 2/541* (2013.01); *F24J 2/5424* (2013.01); *F24J 2/5427* (2013.01); *H02S 20/30* (2014.12); *H02S 30/20* (2014.12); *F24J 2002/5277* (2013.01); *F24J 2002/5455* (2013.01); *F24J 2002/5486* (2013.01); *Y02E 10/47* (2013.01); *Y02E 10/50* (2013.01)

(58) Field of Classification Search
None
See application file for complete search history.

(56) References Cited

U.S. PATENT DOCUMENTS

| | | | | |
|---|---|---|---|---|
| 3,525,483 | A | * | 8/1970 | Van Alstyne ............... 244/172.6 |
| 4,136,432 | A | * | 1/1979 | Melley, Jr. ................ B60P 3/00 29/469 |
| 4,155,524 | A | | 5/1979 | Marello et al. |
| 4,883,340 | A | * | 11/1989 | Dominguez ............. F21S 11/00 126/576 |
| 5,319,905 | A | * | 6/1994 | Szirtes ................... B64G 1/443 136/245 |
| 5,379,596 | A | * | 1/1995 | Grayson ............... F25B 27/002 136/245 |

(Continued)

OTHER PUBLICATIONS

International Search Report and Written Opinion dated Sep. 12, 2014 for PCT Application No. PCT/US2014/037811 filed May 13, 2014 (10 p.).

*Primary Examiner* — Joshua J Michener
*Assistant Examiner* — Kyle Walraed-Sullivan
(74) *Attorney, Agent, or Firm* — Chamberlain, Hrdlicka

(57) ABSTRACT

An assembly for positioning photovoltaic panels on a structure includes a main frame connectable to the structure, and a subassembly connectable to the main frame to support a photovoltaic panel, in which the subassembly is rotatable with respect to the main frame to place the subassembly in a deployed position. The assembly may further include a stop-arm connectable to the main frame to support the subassembly when in the deployed position.

20 Claims, 31 Drawing Sheets

(56) References Cited

U.S. PATENT DOCUMENTS

| | | | | |
|---|---|---|---|---|
| 5,520,747 A * | 5/1996 | Marks | | 136/245 |
| 5,969,501 A * | 10/1999 | Glidden | | F24J 2/523 |
| | | | | 320/101 |
| 6,394,395 B1 * | 5/2002 | Poturalski et al. | | 244/172.7 |
| 6,637,702 B1 * | 10/2003 | McCandless | | B64G 1/222 |
| | | | | 244/172.6 |
| 6,870,087 B1 * | 3/2005 | Gallagher | | F24J 2/38 |
| | | | | 136/244 |
| 7,476,832 B2 * | 1/2009 | Vendig | | F24J 2/405 |
| | | | | 250/203.1 |
| 8,440,950 B1 * | 5/2013 | Reischmann | | F24J 2/38 |
| | | | | 126/573 |
| 8,593,102 B2 * | 11/2013 | McGuire | | F03D 1/005 |
| | | | | 136/245 |
| 2003/0116188 A1 * | 6/2003 | Hsieh | | F04D 25/06 |
| | | | | 136/244 |
| 2003/0127125 A1 * | 7/2003 | Yeh | | 136/251 |
| 2004/0124711 A1 * | 7/2004 | Muchow et al. | | 307/64 |
| 2007/0051360 A1 * | 3/2007 | Rhee | | F24J 2/085 |
| | | | | 126/574 |
| 2007/0151594 A1 * | 7/2007 | Mascolo | | F24J 2/5239 |
| | | | | 136/245 |
| 2009/0165841 A1 * | 7/2009 | Gunn, Jr. | | F24J 2/38 |
| | | | | 136/245 |
| 2009/0178703 A1 * | 7/2009 | Gumm | | H02S 30/20 |
| | | | | 136/244 |
| 2009/0320905 A1 | 12/2009 | Botkin et al. | | |
| 2010/0000592 A1 * | 1/2010 | Ko | | 136/246 |
| 2010/0108120 A1 * | 5/2010 | Lin | | H02S 30/20 |
| | | | | 136/245 |
| 2011/0005573 A1 * | 1/2011 | Chang et al. | | 136/245 |
| 2011/0023864 A1 * | 2/2011 | Andretich | | F24J 2/5264 |
| | | | | 126/570 |
| 2011/0061644 A1 * | 3/2011 | Pizzarello et al. | | 126/573 |
| 2011/0073161 A1 * | 3/2011 | Scanlon | | F24J 2/38 |
| | | | | 136/246 |
| 2011/0094503 A1 * | 4/2011 | Jones | | H02S 20/32 |
| | | | | 126/714 |
| 2011/0108112 A1 * | 5/2011 | Hong | | F24J 2/541 |
| | | | | 136/259 |
| 2011/0108670 A1 * | 5/2011 | Legrand et al. | | 244/159.5 |
| 2011/0146751 A1 * | 6/2011 | McGuire | | F03D 1/005 |
| | | | | 136/245 |
| 2012/0025750 A1 * | 2/2012 | Margo | | 320/101 |
| 2012/0080072 A1 * | 4/2012 | Bullivant | | H02S 10/00 |
| | | | | 136/246 |
| 2012/0090660 A1 * | 4/2012 | Keller | | B64G 1/222 |
| | | | | 136/245 |
| 2012/0111318 A1 * | 5/2012 | Park | | F24J 2/541 |
| | | | | 126/605 |
| 2012/0125401 A1 * | 5/2012 | DeVillier | | 136/246 |
| 2012/0285506 A1 * | 11/2012 | Kuo | | 136/246 |
| 2012/0291847 A1 * | 11/2012 | Rowe et al. | | 136/245 |
| 2012/0293111 A1 * | 11/2012 | Sentinelli et al. | | 320/101 |
| 2012/0313569 A1 * | 12/2012 | Curran | | 320/101 |
| 2013/0082637 A1 | 4/2013 | Eaton et al. | | |
| 2013/0186120 A1 * | 7/2013 | Lee | | F24F 1/06 |
| | | | | 62/235.1 |
| 2013/0233371 A1 * | 9/2013 | Rodin et al. | | 136/245 |
| 2013/0269750 A1 * | 10/2013 | Tucker | | H01L 31/045 |
| | | | | 136/245 |
| 2014/0231284 A1 * | 8/2014 | Ansari | | B23P 19/04 |
| | | | | 206/216 |
| 2014/0238467 A1 * | 8/2014 | Martin | | H01L 31/052 |
| | | | | 136/248 |
| 2014/0261387 A1 * | 9/2014 | Hansen | | 126/608 |
| 2014/0263844 A1 * | 9/2014 | Cook, Jr. | | B64G 1/222 |
| | | | | 244/164 |
| 2015/0083191 A1 * | 3/2015 | Gmundner | | H01L 31/048 |
| | | | | 136/245 |

* cited by examiner

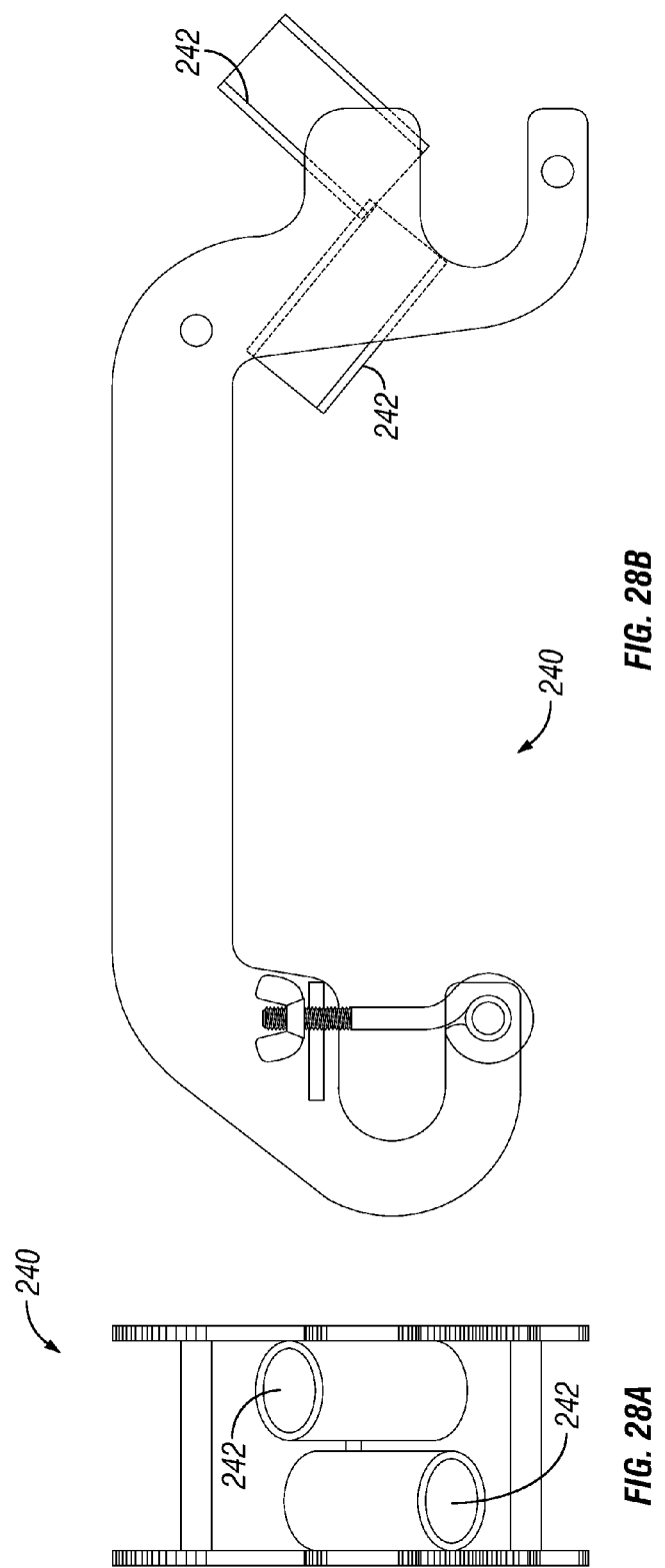

MOBILE SOLAR POWER RACK

BACKGROUND

Due to increasing environmental concerns, alternatives to non-renewable and polluting fossil fuels are constantly being investigated. Solar energy has received increasing attention as an alternative renewable, non-polluting energy source, and photovoltaic installations, such as on commercial and residential roofs, are becoming increasingly popular. It is well known that solar power is derived from photovoltaic systems, solar panels made from silicon, and from other materials and thin film solar deployments. An array of solar panels tied together with one or more solar power gathering devices is an environmentally sustainable method of generating clean energy that can be used internationally. Solar power generation can come from thin film solar applications, panelized silicon crystal applications, and also from passive solar design schemes and many other sources. The cost of solar power gathering systems has decreased in recent years with efficiency improving. Traditional photovoltaic racking systems often require lengthy and complicated assembly and shipping methodologies, which may increase the need for specialized or costly tools or shipping requirements.

BRIEF DESCRIPTION OF THE DRAWINGS

For a detailed description of the preferred embodiments of the present disclosure, reference will now be made to the accompanying drawings in which:

FIGS. 28A and 28B show lateral and longitudinal views of a lever attachment mechanism for use with a lever or lever arm in accordance with one or more embodiments of the present disclosure.

DETAILED DESCRIPTION

Figure 1:
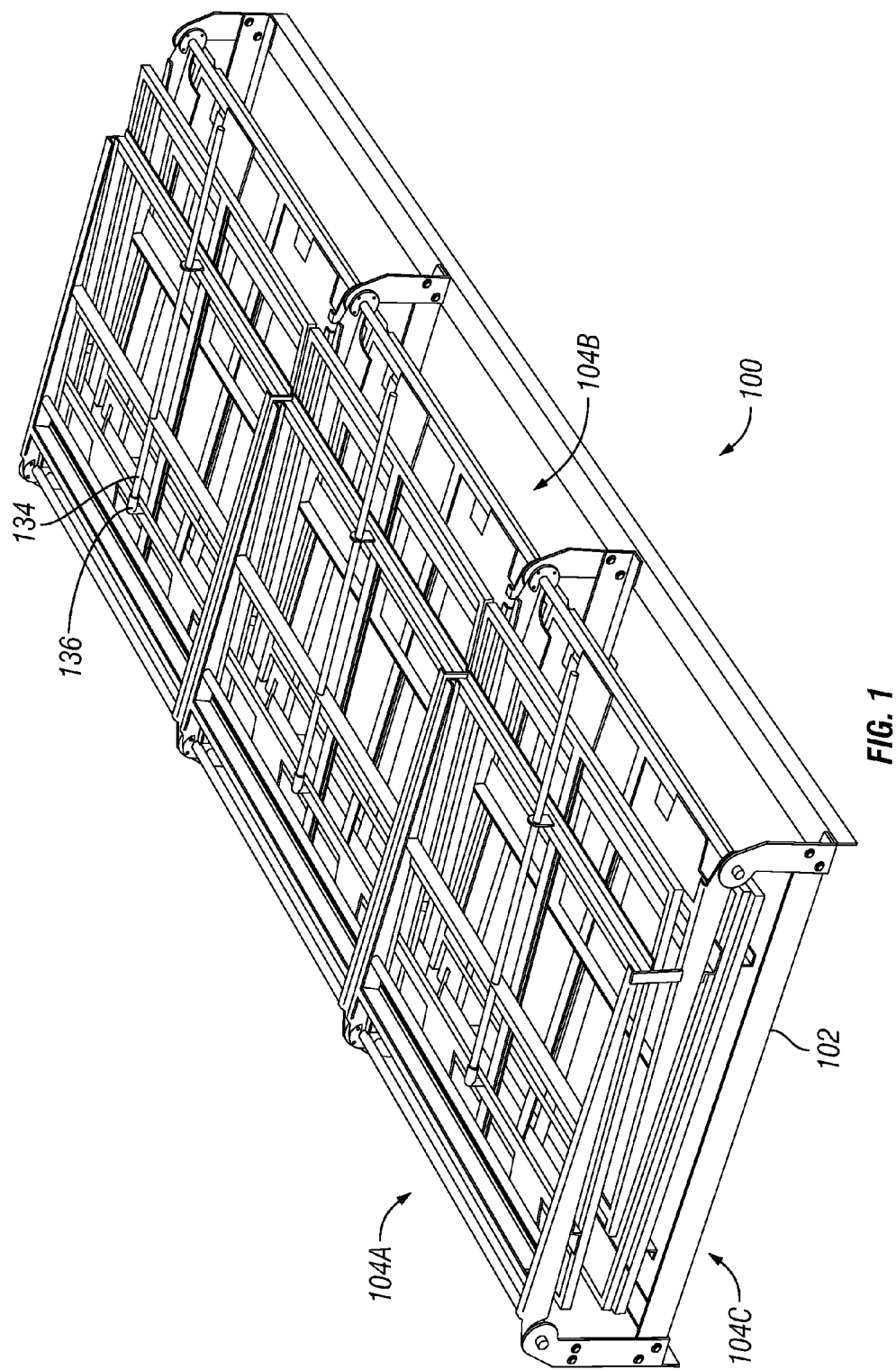
FIG. 1 shows a perspective view of an assembly in a folded position in accordance with one or more embodiments of the present disclosure.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be an illustration of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Further, the use of "top," "bottom," "above," "below," and variations of these terms is made for perspective and convenience, but may not require any particular orientation of the components.

In accordance with one or more embodiments, the present disclosure may relate to an assembly for positioning a photovoltaic panel on a modular structure. The assembly may include a main frame that may be connectable or mountable on a top surface of the modular structure, such that a footprint of the main frame may be substantially similar to the top surface of the modular structure. A subassembly may be connectable to the main frame to support a photovoltaic panel such that the subassembly is rotatable with respect to the main frame to deploy the subassembly. For example, the subassembly may be rotatable between a folded position and a deployed position with respect to the main frame, and further the subassembly may be biased to a central position between the folded position and the deployed position. The assembly may further include a stop-arm connectable, such as removably connectable, to the main frame to support the subassembly when deployed. The subassembly may be connectable to one side of the main frame, in which the assembly may include a second subassembly connectable to another side of the main frame to support a second photovoltaic panel such that the second subassembly rotatable with respect to the main frame to deploy the second subassembly. Further, the assembly may further include a third subassembly connectable to the main frame between the first subassembly and the second subassembly to support a third photovoltaic panel.

The main frame may include a first side support member, a second side support member, and a cross support member connectable between to the first side support member and the second side support member. Further, a subassembly support member may be connectable to the first side support member with the subassembly rotatably connectable to the subassembly support member and the stop-arm connectable to the subassembly support member. The stop-arm may be adjustably connectable to the main frame such that an angle at which the subassembly is supported by the stop-arm is adjustable with respect to the main frame. Further, a lever or lever bar may be removably connectable to the subassembly to assist rotating the subassembly with respect to the main frame, and/or a locking mechanism may be removably connectable between the subassembly and the main frame to prevent rotation of the subassembly with respect to the main frame, such as when the subassembly is in the folded position.

Further, in one or more embodiments, the present disclosure may provide a kit of parts for a mobile solar power generation system. For example, the present application may provide a kit of parts or components, such as formed or cut by a machine (e.g., computer controlled machine) and/or formed from angle iron, for quick plug-and-play assembly of a custom, foldable solar racking system designed to maximize solar production on modular structures or buildings, such as an intermodal container (e.g., ISO shipping container). The kit of parts and solar equipment may be designed to travel securely inside a modular structure, such as an ISO container for domestic and global applications, for convenient shipping. Amongst other parts or components, the kit of parts for a mobile solar power generation system may include a modular structure, a photovoltaic panel, a main frame connectable to the modular structure, a subassembly connectable to the main frame to support the photovoltaic panel with the subassembly rotatable with respect to the main frame to deploy the subassembly, and a stop-arm connectable to the main frame to support the subassembly when deployed.

Referring now to FIGS. 1-14C, multiple views of an assembly 100 for positioning one or more photovoltaic panels 190 on a modular structure 192 in accordance with one or more embodiments of the present disclosure are shown. The assembly 100 may include a main frame 102 connectable or mountable to the modular structure 192. The assembly 100 may further include one or more subassemblies 104 connectable to the main frame 102, in which each subassembly 104 may support one or more of the photovoltaic panels 190. One or more of the subassemblies 104 may be movable and/or rotatable with respect to the main frame 102 to deploy the subassemblies 104. As such, the subassemblies 104 may be movable and/or rotatable between a folded position and a deployed position with respect to the main frame 102.

Further, in an embodiment in which the assembly 100 includes more than one subassembly 104, a first subassembly 104A (e.g., an exterior subassembly) may be connectable to one side (e.g., a longitudinal side) of the main frame 102, and a second subassembly 104B (e.g., another exterior subassembly) may be connectable to another side (e.g., another longitudinal side) of the main frame 102. In an embodiment in which the assembly 100 includes more than two subassemblies 104, the assembly 100 may further include a third subassembly 104C (e.g., an interior subassembly) connectable to the main frame 102 between the first subassembly 104A and the second subassembly 104B.

Figure 2:
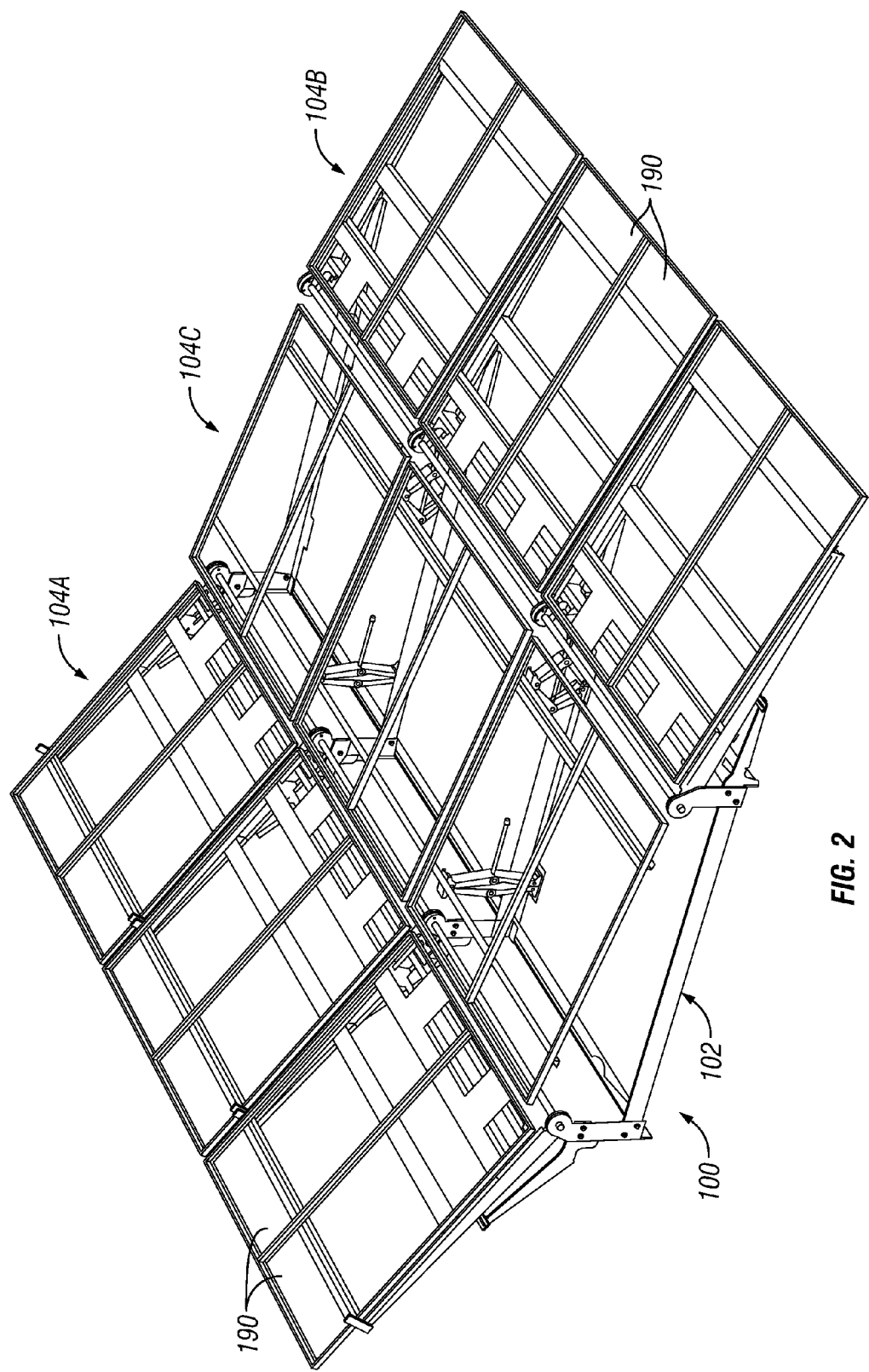
FIG. 2 shows a perspective view of the assembly in a deployed position in accordance with one or more embodiments of the present disclosure.
Figure 3:
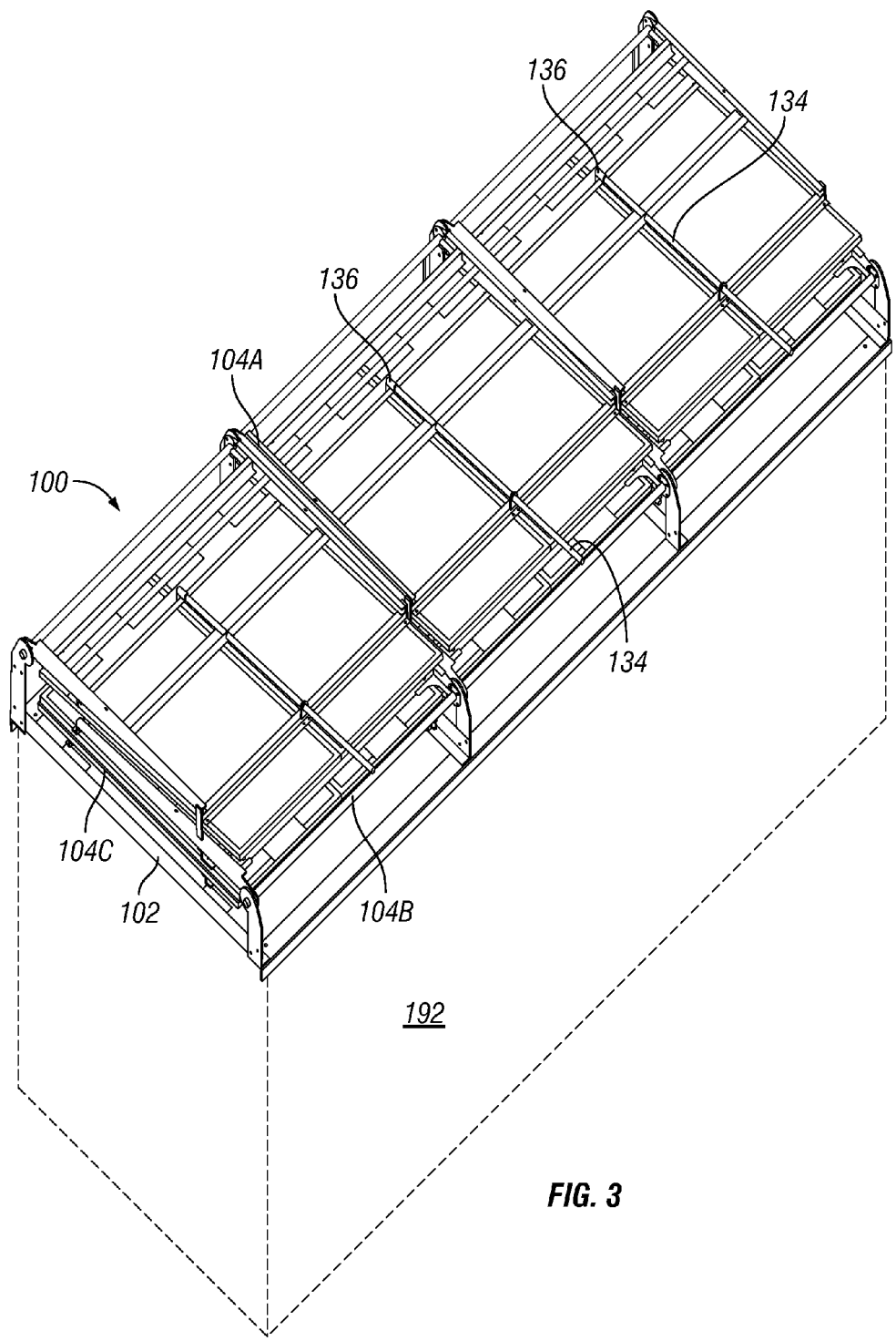
FIG. 3 shows a perspective view of the assembly on a modular structure in the folded position in accordance with one or more embodiments of the present disclosure.
Figure 4:
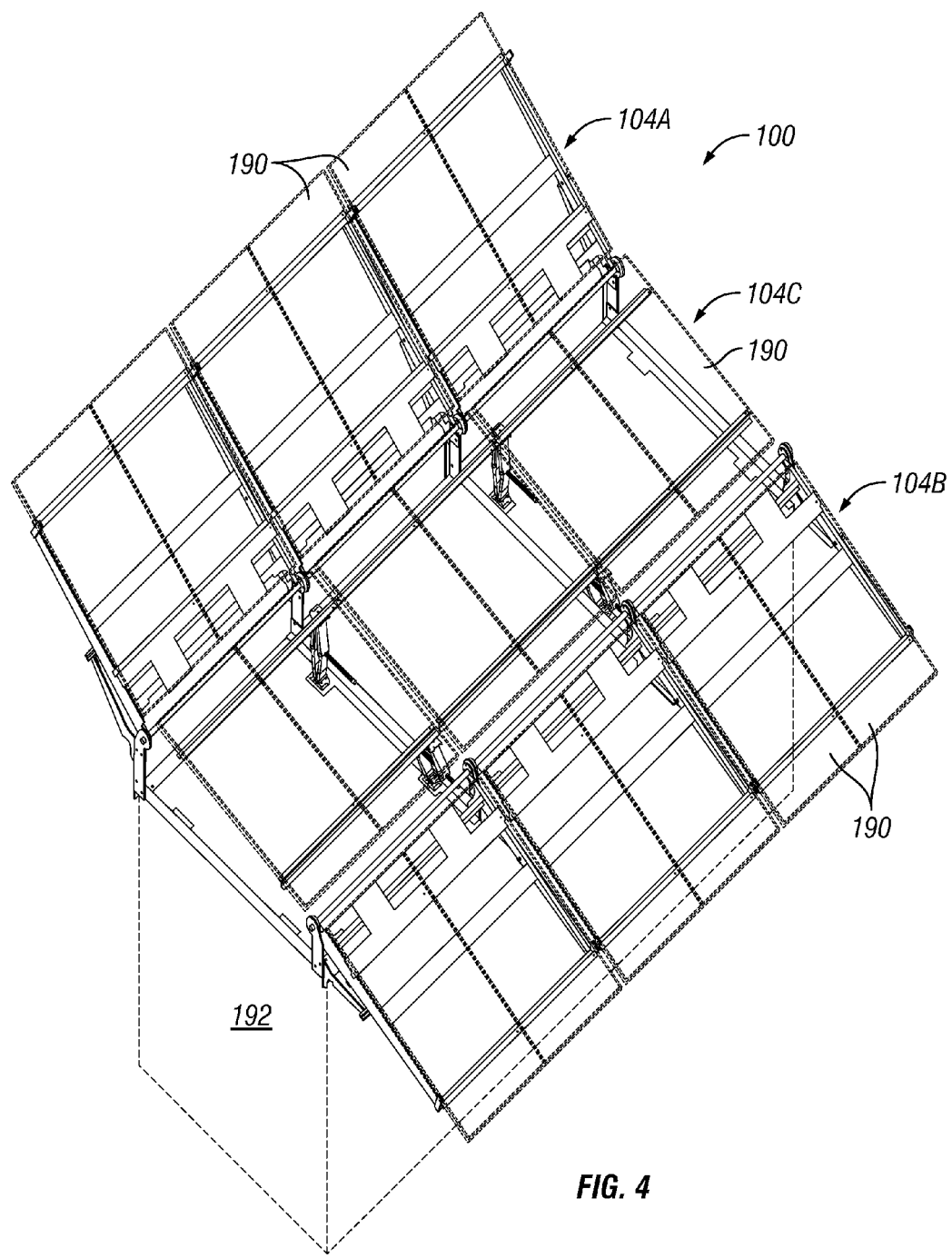
FIG. 4 shows a perspective view of the assembly on the modular structure in the deployed position in accordance with one or more embodiments of the present disclosure.
Figure 5:
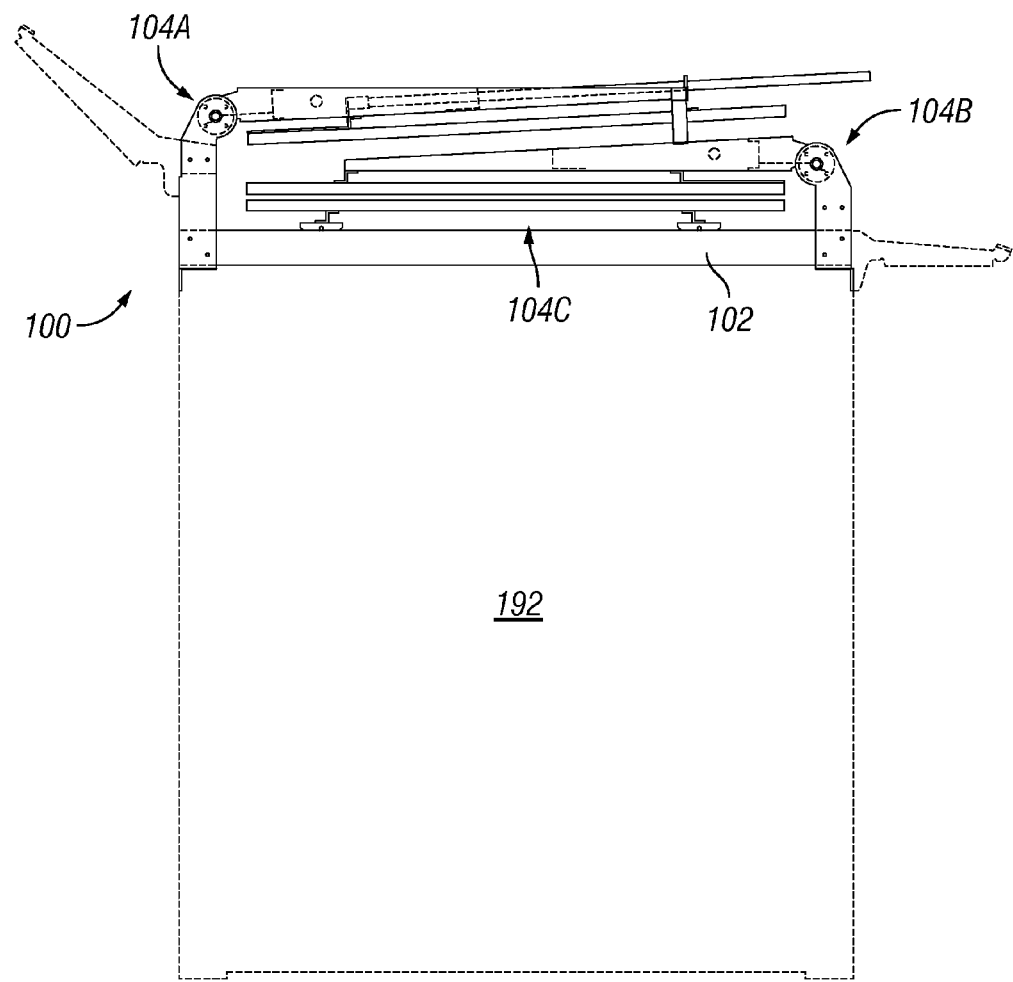
FIG. 5 shows a lateral view of the assembly on the modular structure in the folded position in accordance with one or more embodiments of the present disclosure.
Figure 6:
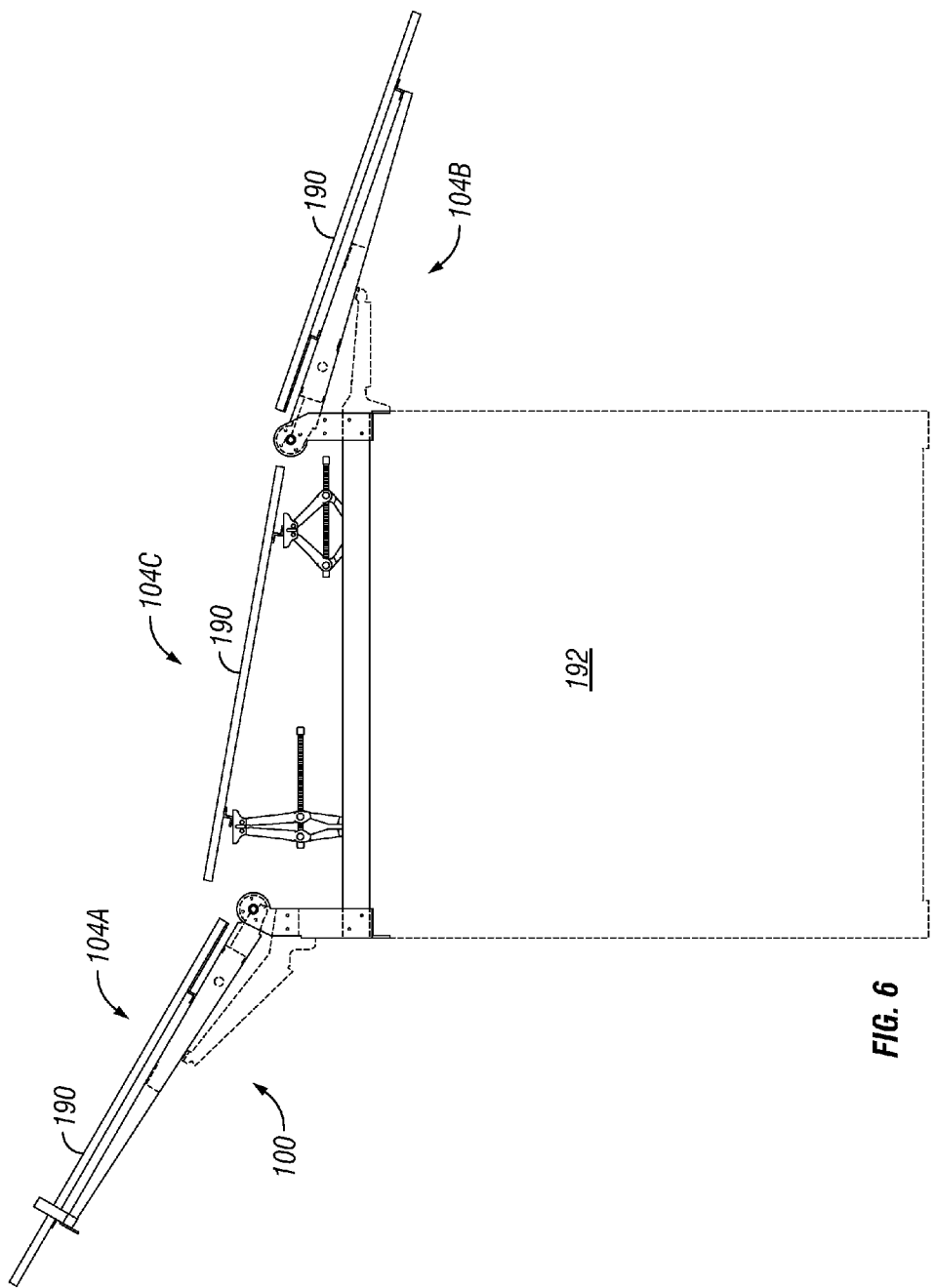
FIG. 6 shows a lateral view of the assembly on the modular structure in the deployed position in accordance with one or more embodiments of the present disclosure.
Figure 7:
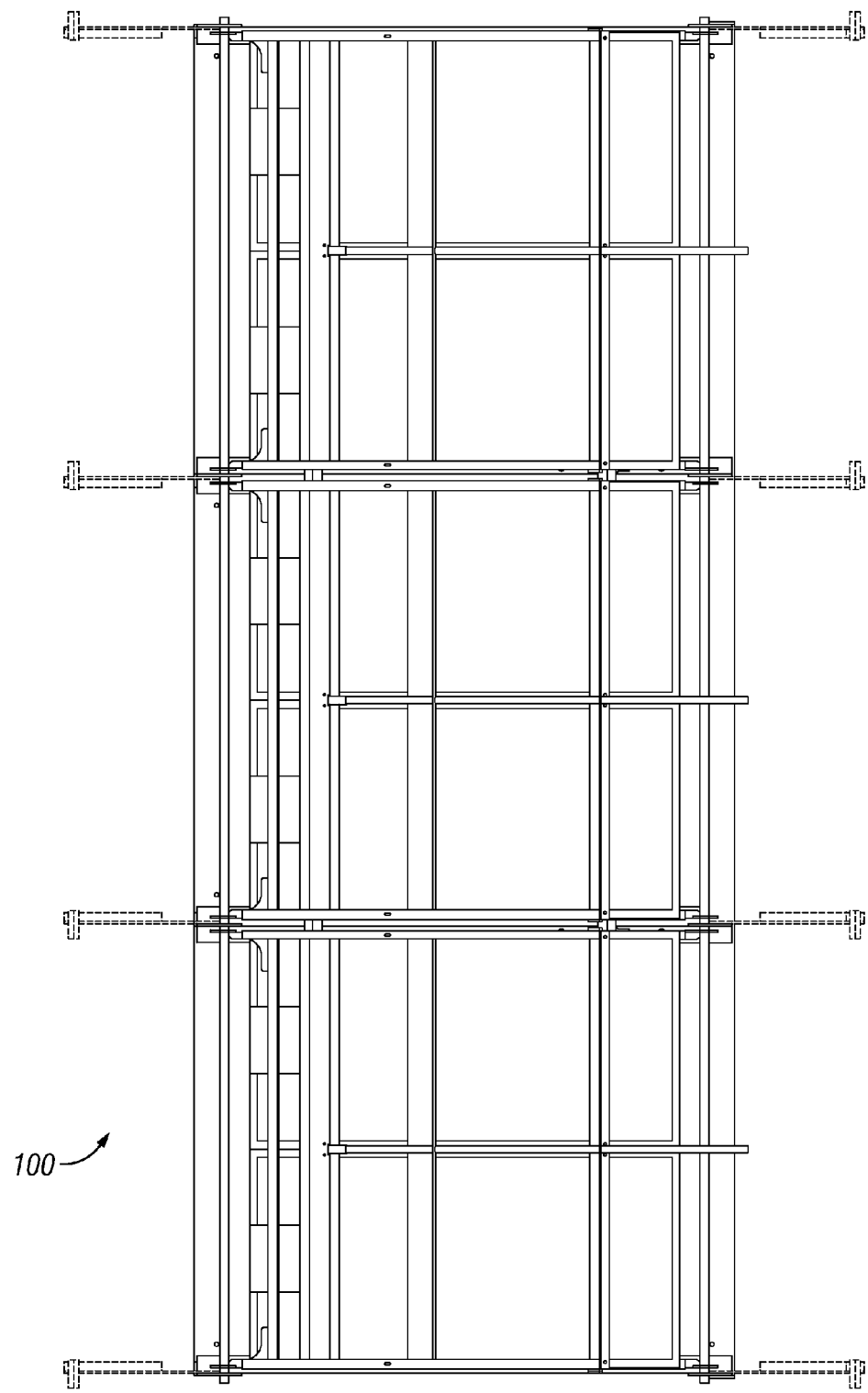
FIG. 7 shows an above view of the assembly on the modular structure in the folded position in accordance with one or more embodiments of the present disclosure.
Figure 8:
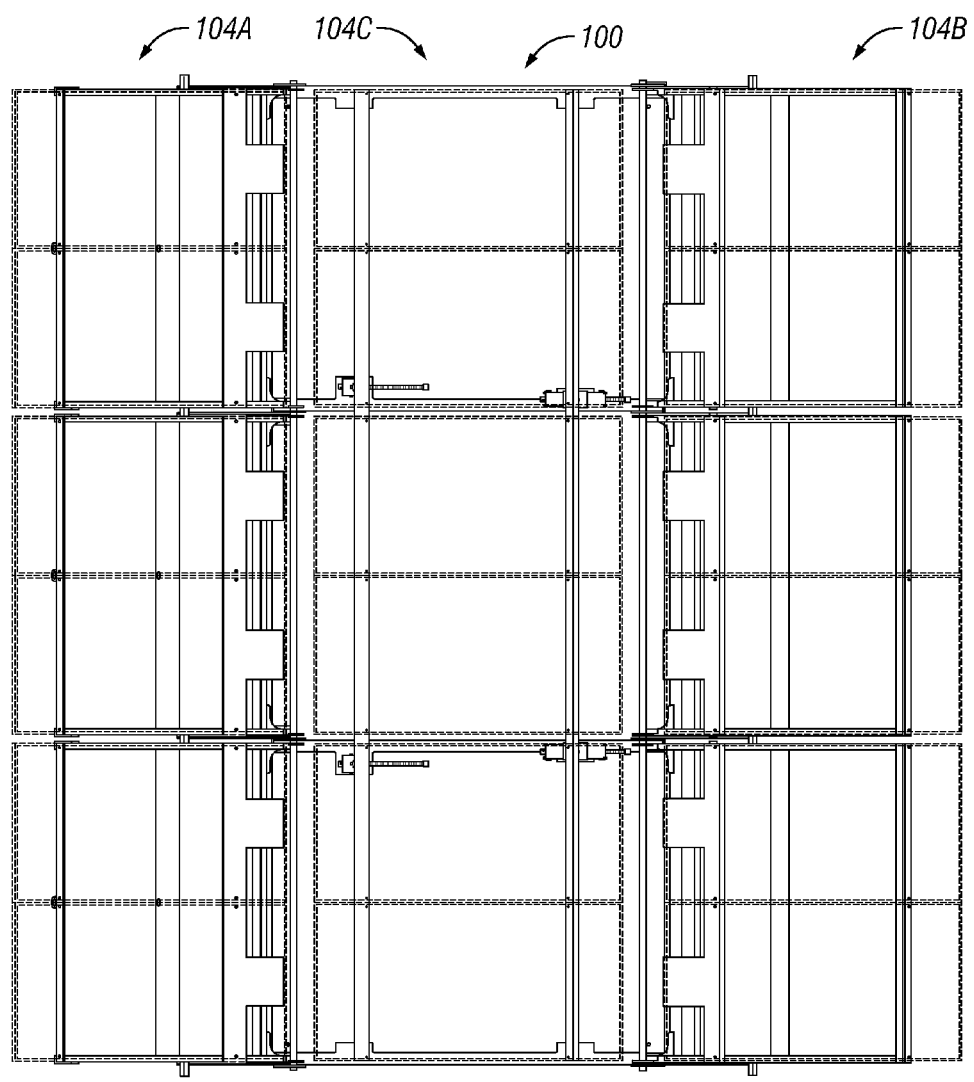
FIG. 8 shows an above view of the assembly on the modular structure in the deployed position in accordance with one or more embodiments of the present disclosure.
Figure 9:
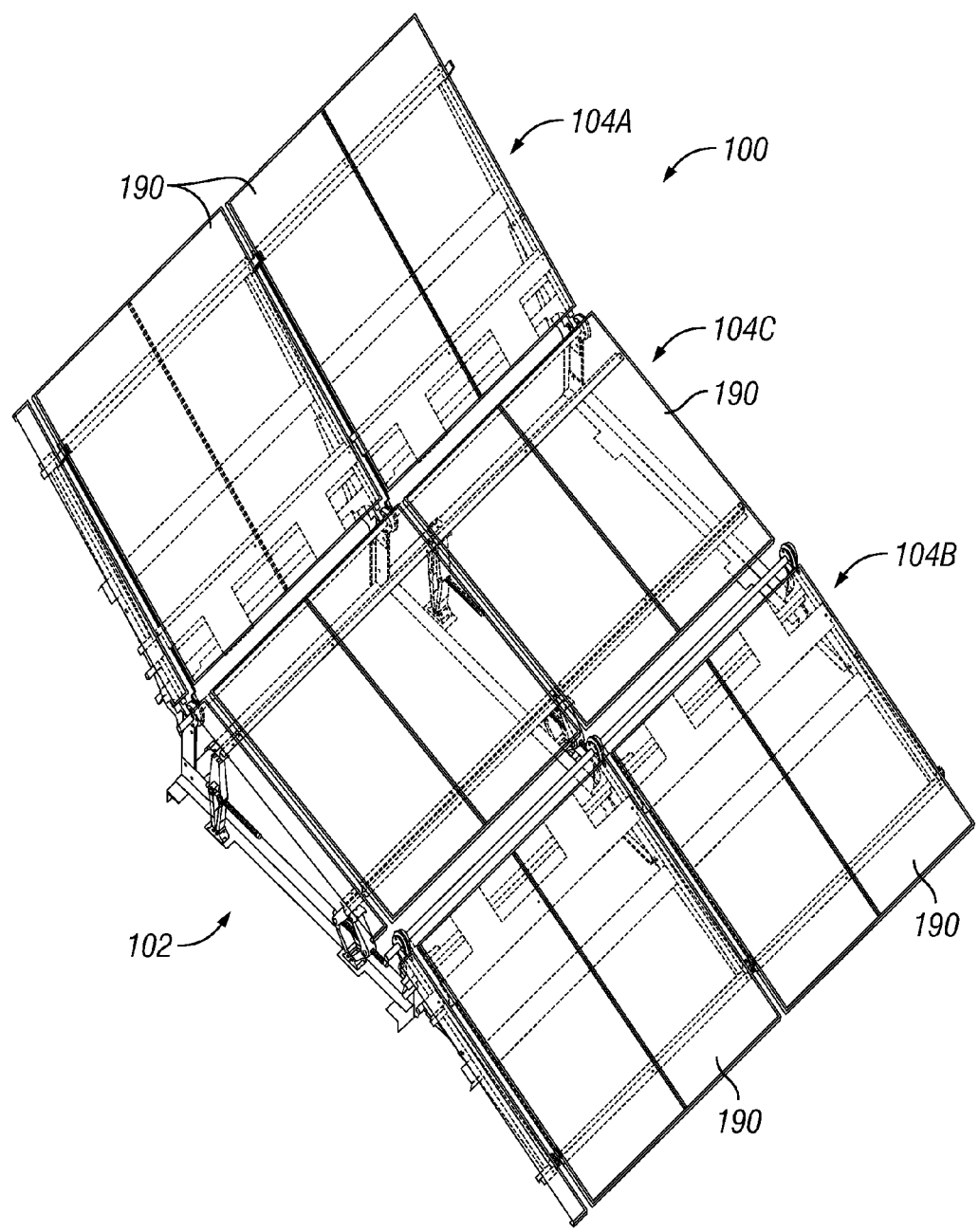
FIG. 9 shows a cutaway view of the assembly in the deployed position in accordance with one or more embodiments of the present disclosure.
Figure 10:
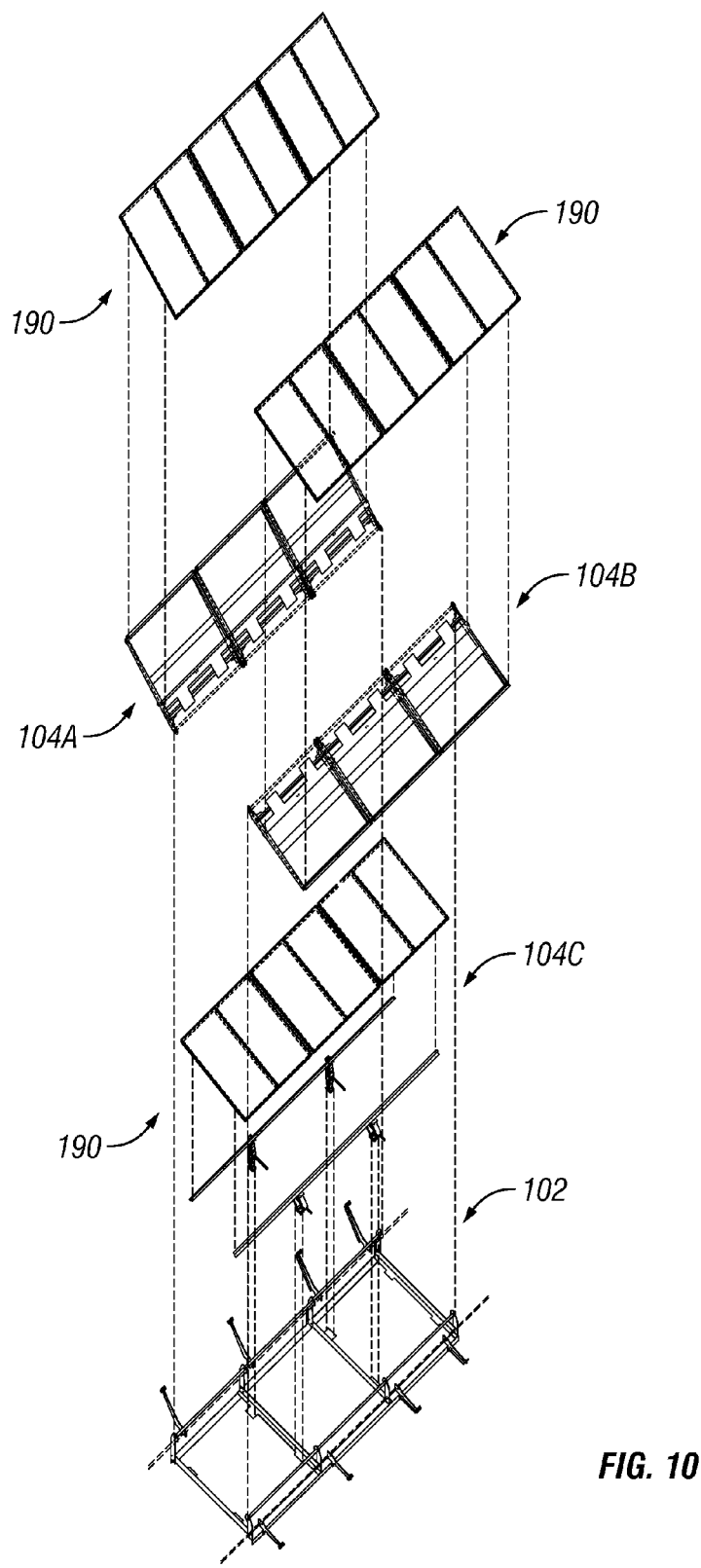
FIG. 10 shows an exploded view of the assembly in accordance with one or more embodiments of the present disclosure.
Figure 11:
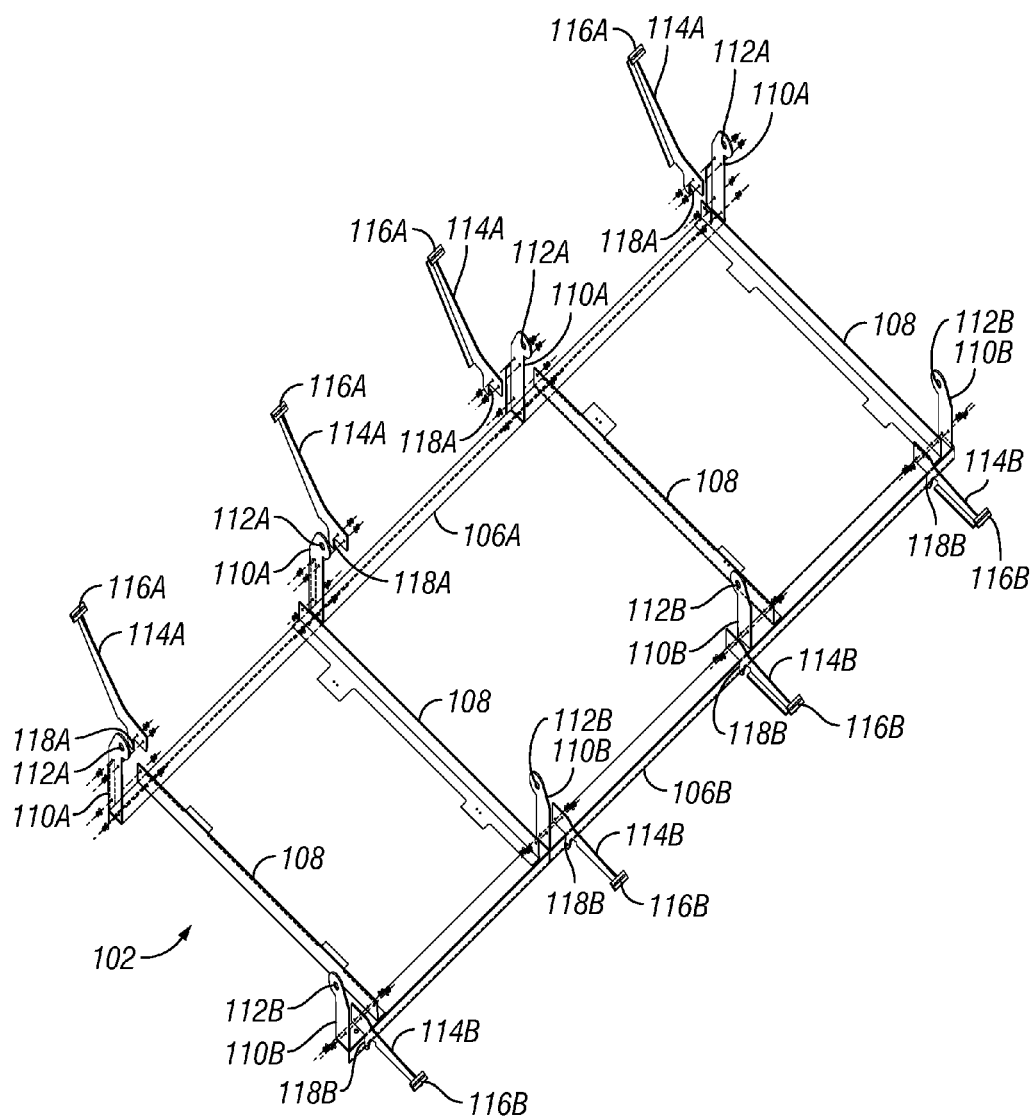
FIG. 11 shows an exploded view of a main frame of the assembly in accordance with one or more embodiments of the present disclosure.
Figure 12:
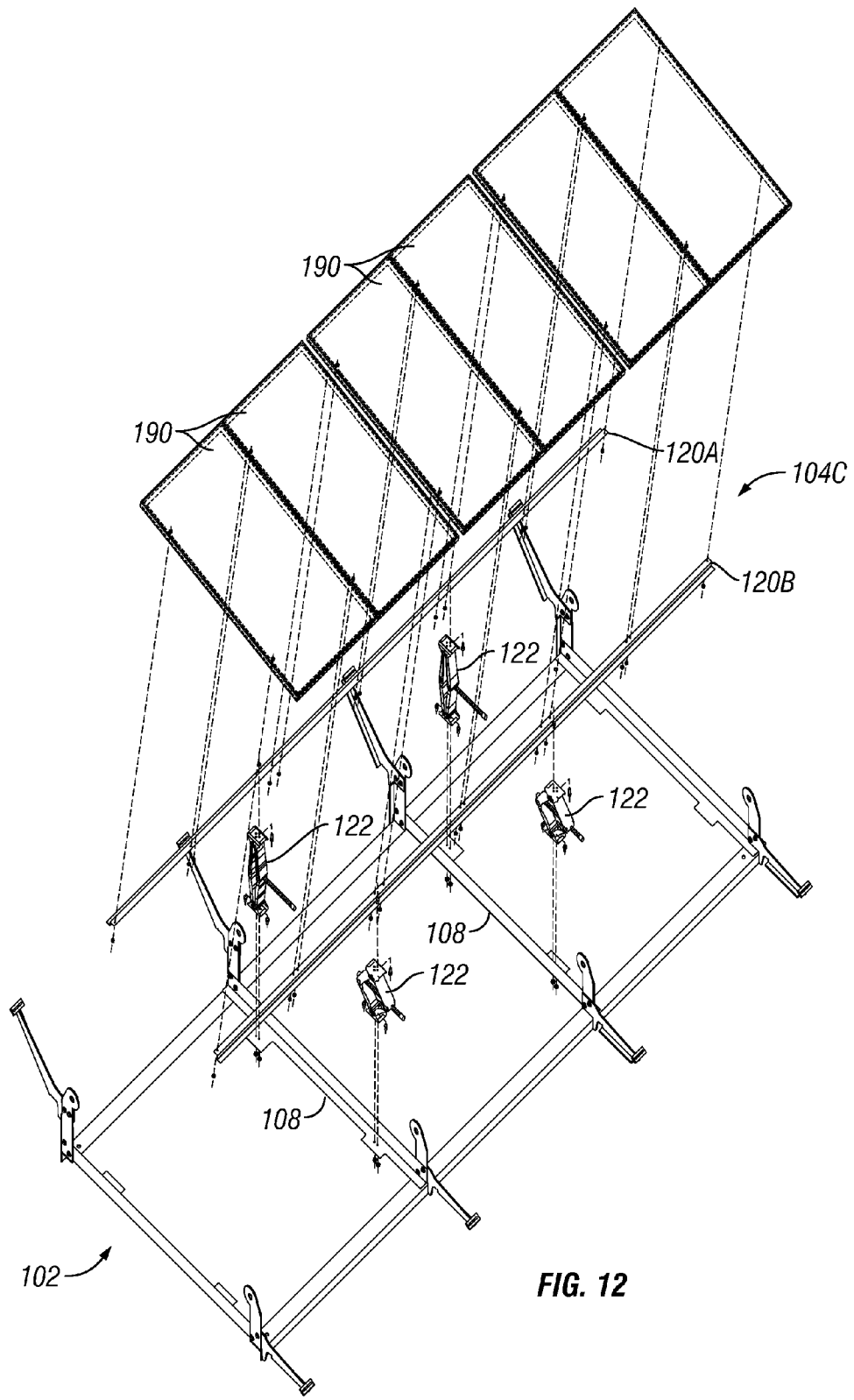
FIG. 12 shows an exploded view of a subassembly connectable to the main frame of the assembly in accordance with one or more embodiments of the present disclosure.
Figure 13:
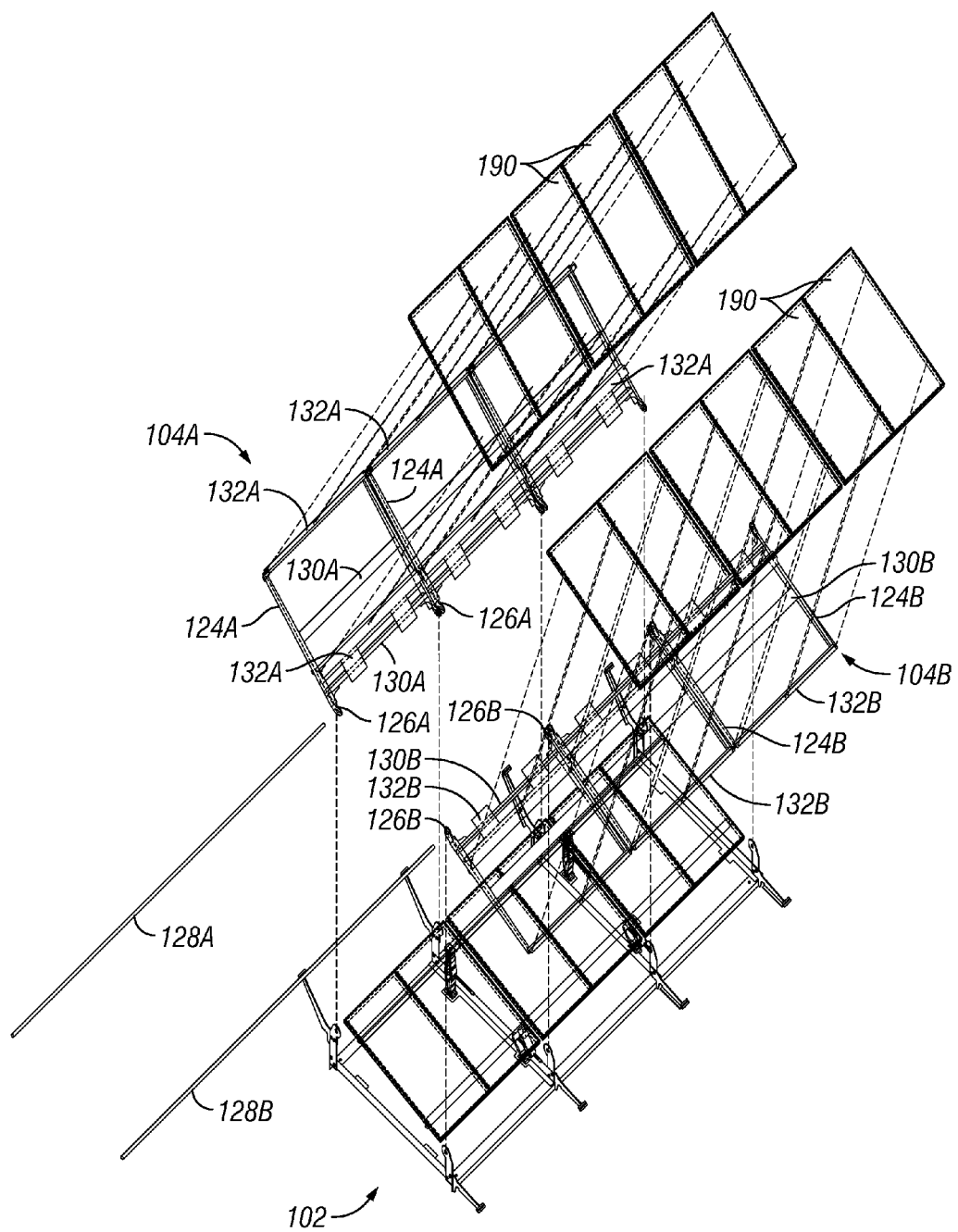
FIG. 13 shows an exploded view of a first subassembly assembly and a second subassembly connectable to the main frame of the assembly in accordance with one or more embodiments of the present disclosure.
Figure 14A:
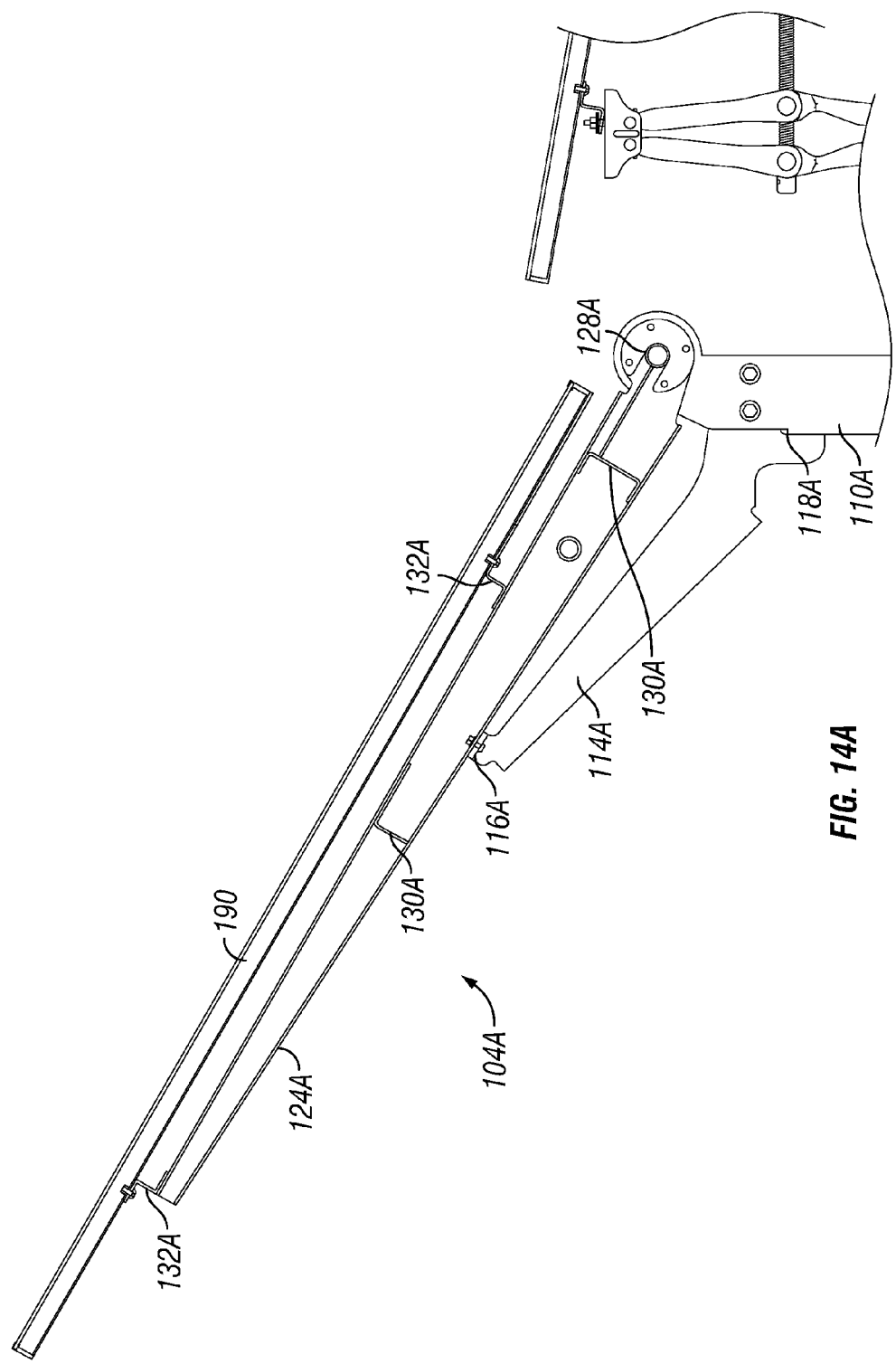
FIGS. 14A, 14B, and 14C show side cross-sectional views of the assembly in the deployed position in accordance with one or more embodiments of the present disclosure.
Figure 14B:
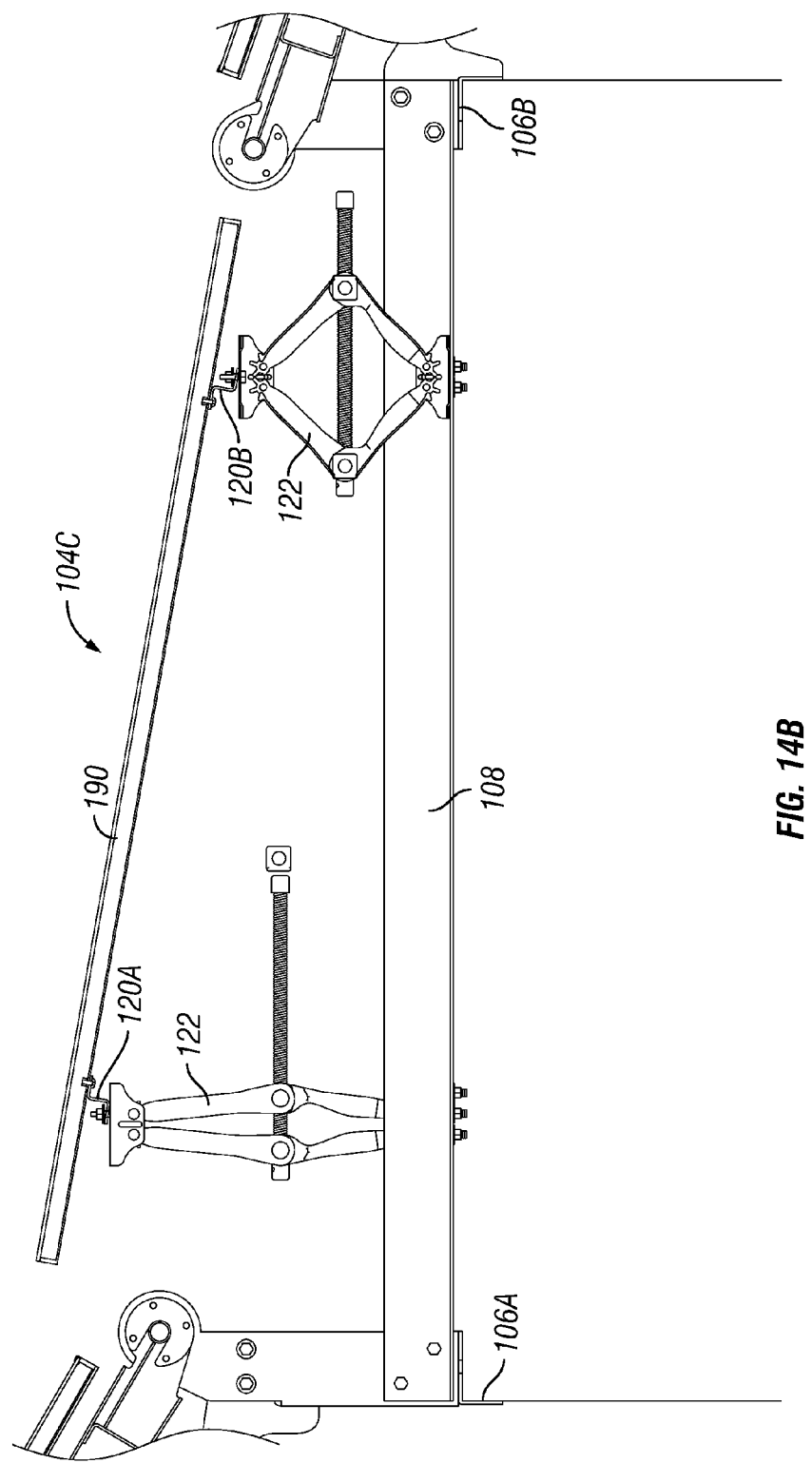
Figure 14C:
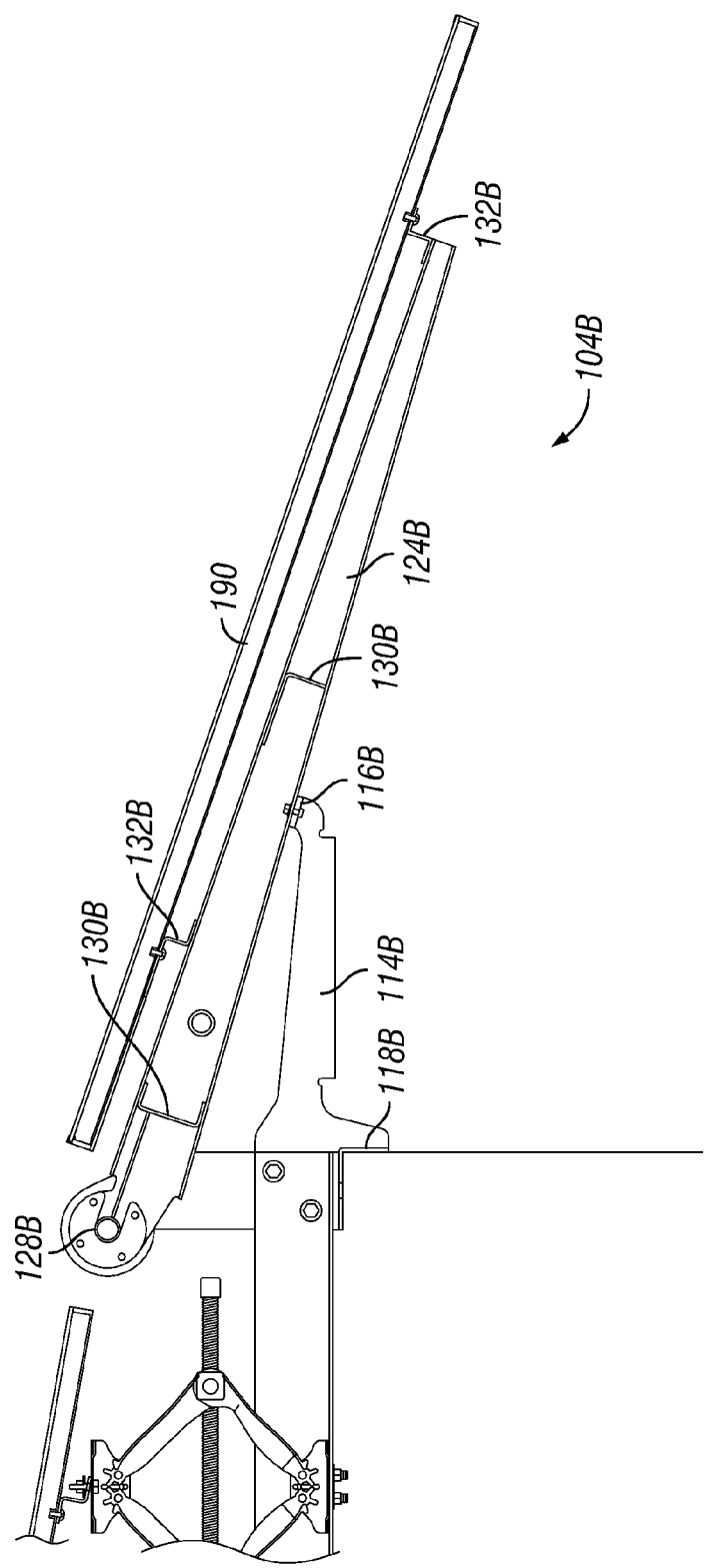

Accordingly, FIG. 1 shows a perspective view of the assembly 100 in a folded position, and FIG. 2 shows a perspective view of the assembly 100 in a deployed position. FIG. 3 shows a perspective view of the assembly 100 on the modular structure 192 in the folded position, and FIG. 4 shows a perspective view of the assembly 100 on the modular structure 192 in the deployed position. FIG. 5 shows a lateral view of the assembly 100 on the modular structure 192 in the folded position, and FIG. 6 shows a lateral view of the assembly 100 on the modular structure 192 in the deployed position. FIG. 7 shows an above view of the assembly 100 on the modular structure 192 in the folded position, and FIG. 8 shows an above view of the assembly 100 on the modular structure 192 in the deployed position. FIG. 9 shows a cutaway view of the assembly 100 in the deployed position, and FIG. 10 shows an exploded view of the assembly 100. FIG. 11 shows an exploded view of the main frame 102 of the assembly 100, FIG. 12 shows an exploded view of the third subassembly 104C (e.g., interior subassembly) connectable to the main frame 102 of the assembly 100, and FIG. 13 shows an exploded view of the first subassembly assembly 104A and the second subassembly 104B (e.g., exterior subassemblies) connectable to the main frame 102 of the assembly 100. Further, FIGS. 14A, 14B, and 14C show side cross-sectional views of the assembly 100 in the deployed position.

In one or more embodiments, as the main frame 102 may be connectable or mountable to the modular structure 192, a footprint of the main frame 102 may be similar in shape and/or in size as a top side of the modular structure 192. Accordingly, as discussed above, the modular structure 192 may be an intermodal container (e.g., ISO shipping container), and therefore may have a standardized size of about 20 ft (6.10 m) in length and about 8 ft (2.44 m) in width. As such, the main frame 102 may have a size of about 20 ft (6.10 m) in length and/or about 8 ft (2.44 m) in width, though the present disclosure is not so limited. For example, in one or more embodiments, the main frame 102 may have an adjustable width and/or adjustable length, and/or the main frame 102 may be built to accommodate modular structures of different lengths, as an intermodal container may vary in length from about 8 ft (2.44 m) up to about 56 ft (17.07 m).

In one or more embodiments, one side of the main frame 102 may be connectable or mountable to one side of the modular structure 192, and another side of the main frame 102 may be connectable or mountable to another side of the modular structure 192. Accordingly, as shown specifically in FIG. 11, the main frame 102 may include a first side support member 106A and a second side support member 106B. The first side support member 106A and the second side support member 106B may extend along at least a portion of the longitudinal side of the modular structure 192. Further, one or more cross support members 108 may extend between and/or be connected between the first side support member 106A and the second side support member 106B. In this embodiment, four cross support members 108 are shown as connected between the first side support member 106A and the second side support member 106B.

One or more subassembly support members 110 may then be connected to the main frame 102. In FIG. 11, the main frame 102 may include one or more first subassembly support members 110A, such as to rotatably connect the first subassembly 104A thereto, and/or may include one or more second subassembly support members 110B, such as to rotatably connect the second subassembly 104B thereto. The first subassembly support members 110A may be connected to the first side support member 106A and/or each of the cross support members 108. Each of the first subassembly support members 110A may then include a hole 112A formed therethrough to rotatably connect the first subassembly 104A to the main frame 102. Further, the second subassembly support members 110B may be connected to the second side support member 106B and/or each of the cross support members 108.

Each of the second subassembly support members 110B may then include a hole 112B formed therethrough to rotatably connect the second subassembly 104B to the main frame 102. As shown, one or more of the first subassembly support members 110A may be longer, extend further from the main frame 102, and/or be connected to the respective subassembly 104 than one or more of the second subassembly support members 110B. This arrangement may enable the connection of the first subassembly 104A with the main frame 102 to sit higher from and/or extend further away from the main frame 102 than the connection of the second subassembly 104B with the main frame 102, thereby enabling a consolidated arrangement for the assembly 100 when in the fold position.

One or more stop arms 114 may be connected to the main frame 102. As shown in the figures, the main frame 102 may include one or more first stop-arms 114A, such as each first stop-arm 114A connected (e.g., removably connected) to the first side support member 106A and/or each of the cross support members 108. The first stop-arms 114A may then be used to support the first subassembly 104A when deployed (e.g., in the deployed position). For example, one or more of the first stop-arms 114A may include a support surface 116A (e.g., support pad) that engages and/or contacts the first subassembly 104A when deployed. Further, one or more of the first stop-arms 114A may include an abutment surface 118A (e.g., a projection or projected surface) that abuts against the main frame 102, such as abutting against the first subassembly support members 110A in this embodiment.

Further, the main frame 102 may include one or more second stop-arms 114B, such as each second stop-arm 114B connected (e.g., removably connected) to the second side support member 106B and/or each of the cross support members 108. The second stop-arms 114B may then be used to support the second subassembly 104B when deployed (e.g., in the deployed position). For example, one or more of the second stop-arms 114B may include a support surface 116B (e.g., support pad) that engages and/or contacts the second subassembly 104B when deployed. Further, one or more of the second stop-arms 114B may include an abutment surface 118B (e.g., a projection or projected surface) that abuts against the main frame 102, such as abutting against the second side support member 106B in this embodiment.

As discussed above, one or more of the subassemblies 104 may be connected to the main frame 102 to support one or more of the photovoltaic panels 190. More particularly, one or more of the subassemblies 104 may be movable and/or rotatable with respect to the main frame 102 to deploy the subassembly 104, such as in the deployed position. Accordingly, as shown particularly in FIGS. 5 and 6, the third subassembly 104C may be movable and/or rotatable with respect to the main frame 102, such as to move the third subassembly 104C between the undeployed position and the deployed position.

Referring now to FIG. 12, an exploded view of the third subassembly 104C in accordance with one or more embodiments of the present disclosure is shown. The third subassembly 104C may include one or more support members, such as a first side support member 120A and a second side support member 120B. One or more photovoltaic panels 190 may then be connected to and/or supported by the first side support member 120A and the second side support member 120B. Further, to movably connect the third subassembly 104C to the main frame 102 within the assembly 100, one or more actuators 122 may be connected between the third subassembly 104C and the main frame 102. In this embodiment, one or more actuators 122, such as two actuators 122, may be connected between the first side support member 120A and the cross support members 108 of the main frame 102, and one or more actuators 122, such as two actuators 122, may be connected between the second side support member 120B and the cross support members 108 of the main frame 102. The actuators 122 may then be able to rotate and adjust a height of the third subassembly 104C between an undeployed position and a deployed position with respect to the main frame 102.

In the present disclosure, the actuators 122 may be mechanically powered, such as screw jacks and/or scissor jacks as shown in the present figures. However, those having ordinary skill in the art will appreciate that the present disclosure is not so limited, as one or more actuators of the present disclosure may additionally or alternatively be hydraulically powered, pneumatically powered, electrically powered, and the like.

Referring now to FIG. 13, an exploded view of the first subassembly 104A and the second subassembly 104B in accordance with one or more embodiments of the present disclosure is shown. The subassemblies 104A and 104B may each include one or more arms and support members. For example, the first subassembly 104A may include one or more arms 124A, each including a hole 126A formed therein, that rotatably connect to the main frame 102. In particular, each of the holes 126A of the arms 124A may be aligned with a respective hole 112A of the first subassembly support members 110A with a rod 128A or axle inserted through the holes 112A and 126A to rotatably connect the first subassembly 104A to the main frame 102. Further, the first subassembly 104A may include one or more cross support members 130A extending and/or connected between the arms 124A to connect the arms 124A to each other, and/or may include one or more panel support members 132A extending and/or connected between the arms 124A to support one or more photovoltaic panels 190 on the first subassembly 104A.

Further, the second subassembly 104B may include one or more arms 124B, each including a hole 126B formed therein, that rotatably connect to the main frame 102. In particular, each of the holes 126B of the arms 124B may be aligned with a respective hole 112B of the second subassembly support members 110B with a rod 128B or axle inserted through the holes 112B and 126B to rotatably connect the second subassembly 104B to the main frame 102. Further, the second subassembly 104B may include one or more cross support members 130B extending and/or connected between the arms 124B to connect the arms 124B to each other, and/or may include one or more panel support members 132B extending and/or connected between the arms 124B to support one or more photovoltaic panels 190 on the second subassembly 104B.

In one or more embodiments, the assembly 100 may include one or more levers 134 or lever bars, such as to facilitate moving one or more of the subassemblies 104 between the folded position and the deployed position. For example, the levers 134 may be removably connected to the first subassembly 104A to assist and facilitate rotating the first subassembly 104A with respect to the main frame 102 when deploying the first subassembly 104A. The levers 134 may then be removed, such as from the sockets 136, and inserted into corresponding sockets on the second subassembly 104B, such as to assist and facilitate rotating the second subassembly 104B with respect to the main frame 102 when deploying the second subassembly 104B.

In one or more embodiments, the assembly 100 may include one or more locking mechanisms, such as tie-downs, such as to facilitate preventing undesired movement of one or more components of the assembly 100. For example, one or more locking mechanisms may be coupled between the levers 134 and/or the first subassembly 104A when in the folded position such as to prevent one or more of the subassemblies from deploying. This may be particularly helpful during transport of the assembly 100.

Further, in one or more embodiments, a size of the assembly 100, such as a length and/or a width of the main frame 102 of assembly 100, may be adjustable. With reference to FIG. 11, the main frame 102 may include one or more side support members 106 and one or more cross support members 108, in which one or more of these support members may be adjustable.

For example, the cross support members 108 may be adjustable, such as to extend and/or retract in length, as desired, such that the main frame 102 may expand and/or retract in width. The cross support members 108 may each be formed from one or more segments, in which the segments may then be selectively movable and securable with respect to the each other. The segments of the cross support members 108 may each have multiple holes formed therein with securing mechanisms that may selectively secure the segments of the cross support members 108 to each other as desired. Additionally or alternatively, the segments of the cross support members 108 may have telescoping interaction with each other. Those having ordinary skill in the art will also appreciate that other embodiments and arrangements not specifically disclosed are contemplated and within the scope of the present disclosure.

Referring now to FIGS. 15-28B, multiple views of an assembly 200 for positioning one or more photovoltaic panels 290 on a modular structure 292 in accordance with one or more embodiments of the present disclosure are shown. The assembly 200 may include a main frame 202 connectable or mountable to the modular structure 292. In this embodiment, the main frame 202 and the assembly 200 may have a width similar to that of the modular structure 292, but, as shown, the length of the main frame 202 and the assembly 200 may be longer than the length of the modular structure 292.

The assembly 200 may further include one or more subassemblies 204 connectable to the main frame 202, in which each subassembly 204 may support one or more of the photovoltaic panels 290. As with the above, one or more of the subassemblies 204 may be movable and/or rotatable with respect to the main frame 202 to deploy the subassemblies 204. As such, the subassemblies 204 may be movable and/or rotatable between a folded position and a deployed position with respect to the main frame 202. In this embodiment, as the assembly 200 includes more than one subassembly 204, a first subassembly 204A (e.g., an exterior subassembly) may be connectable to one side (e.g., a longitudinal side) of the main frame 202, and a second subassembly 204B (e.g., another exterior subassembly) may be connectable to another side (e.g., another longitudinal side) of the main frame 202.

Figure 15:
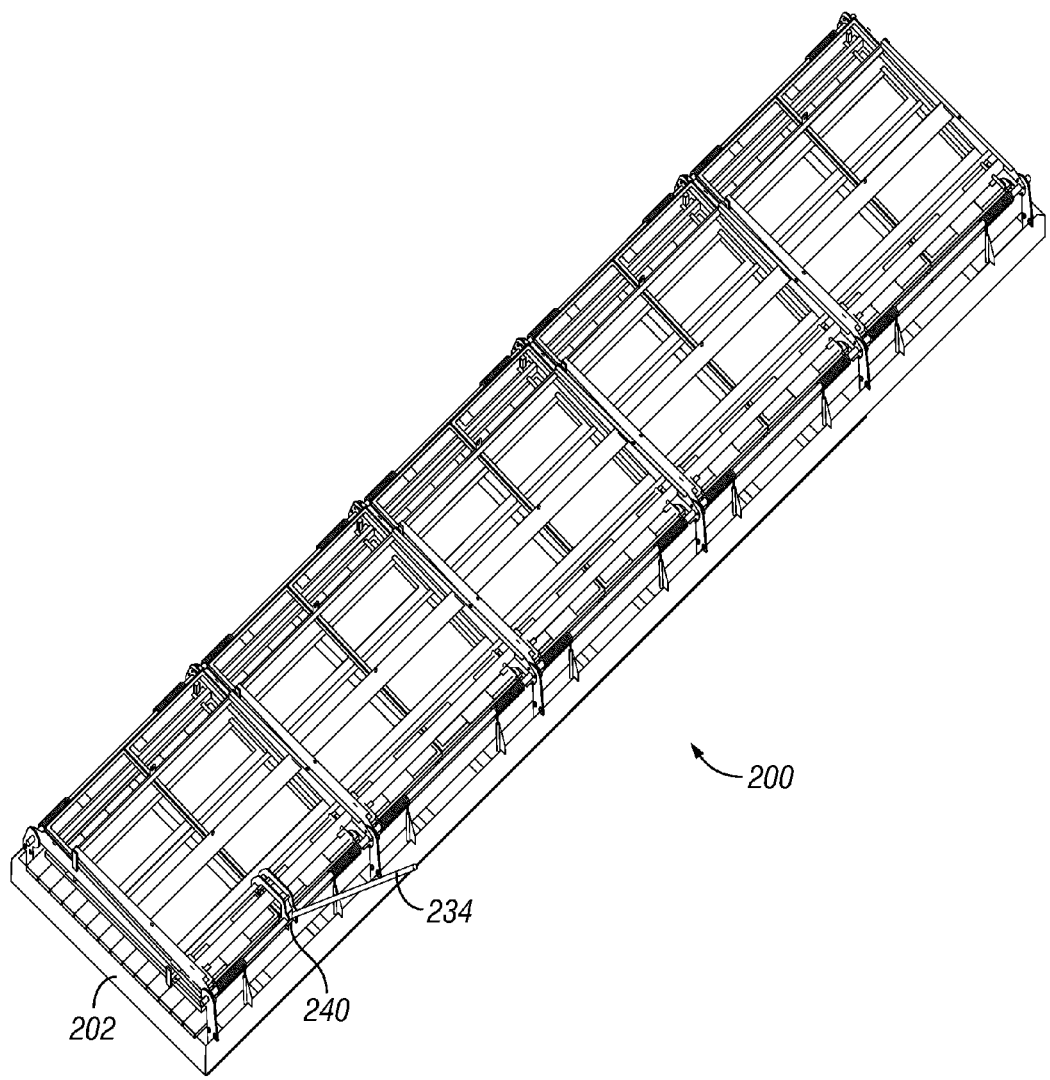
FIG. 15 shows a perspective view of an assembly in a folded position in accordance with one or more embodiments of the present disclosure.
Figure 16:
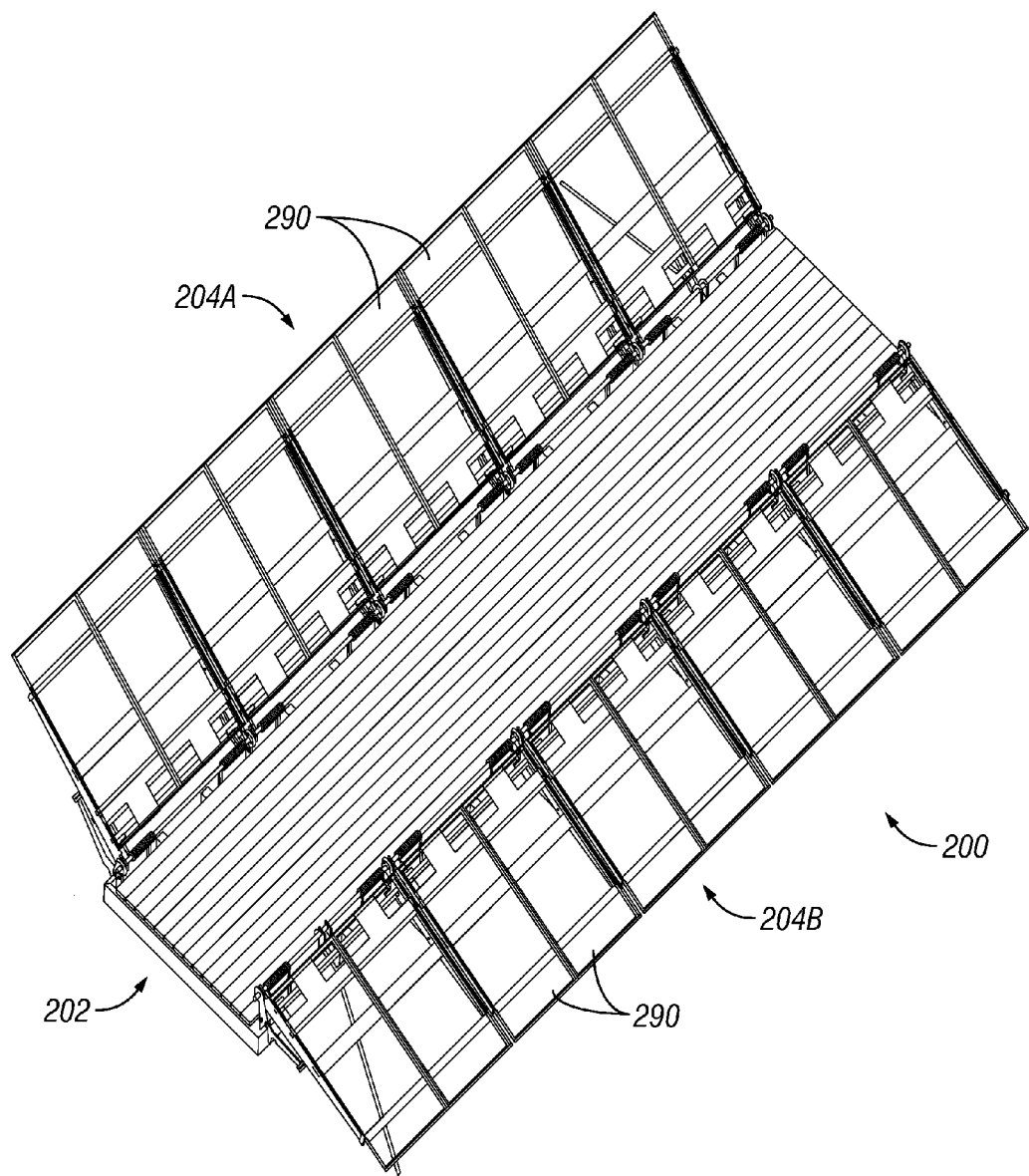
FIG. 16 shows a perspective view of the assembly in a deployed position in accordance with one or more embodiments of the present disclosure.
Figure 17:
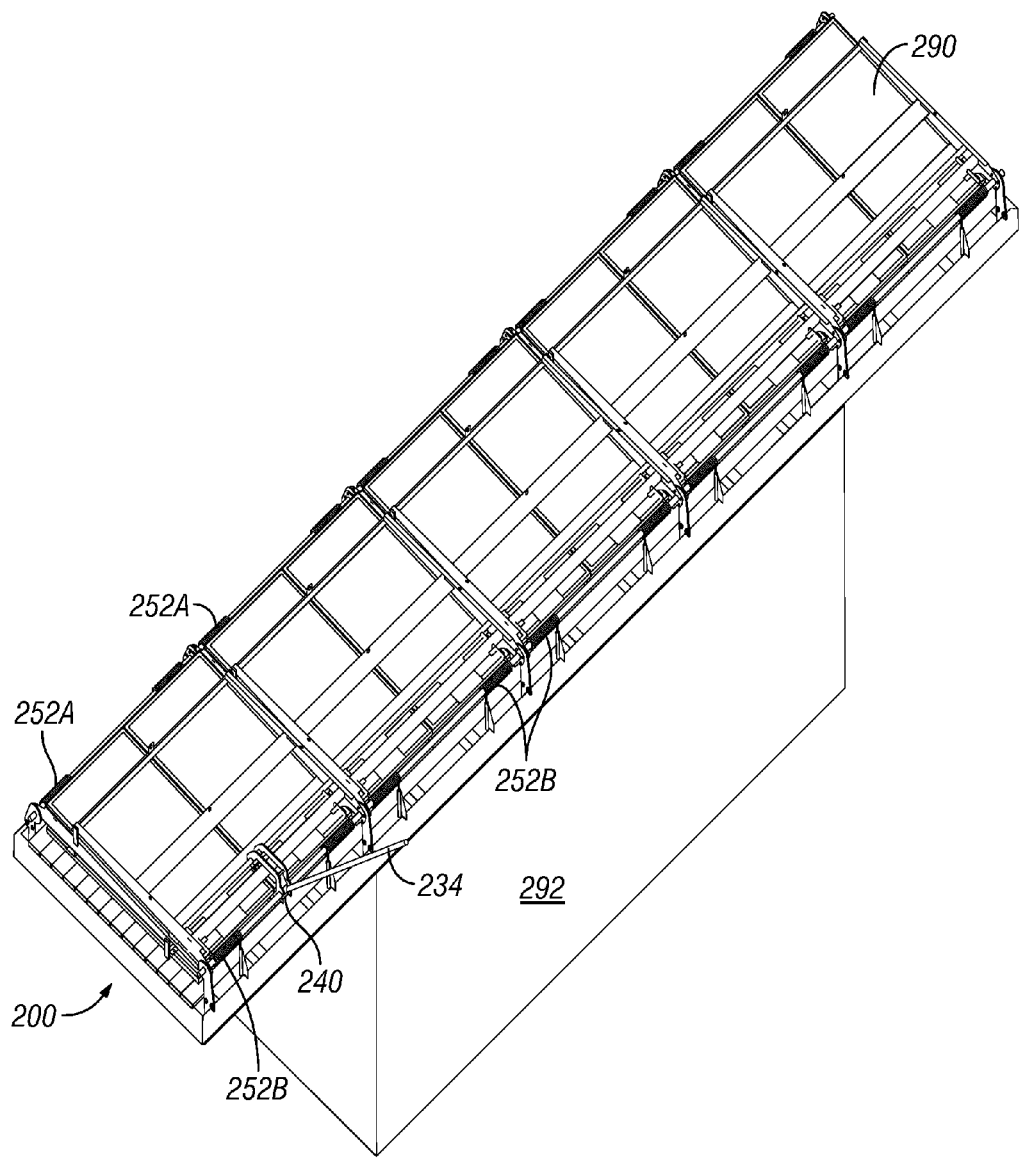
FIG. 17 shows a perspective view of the assembly on a modular structure in the folded position in accordance with one or more embodiments of the present disclosure.
Figure 18:
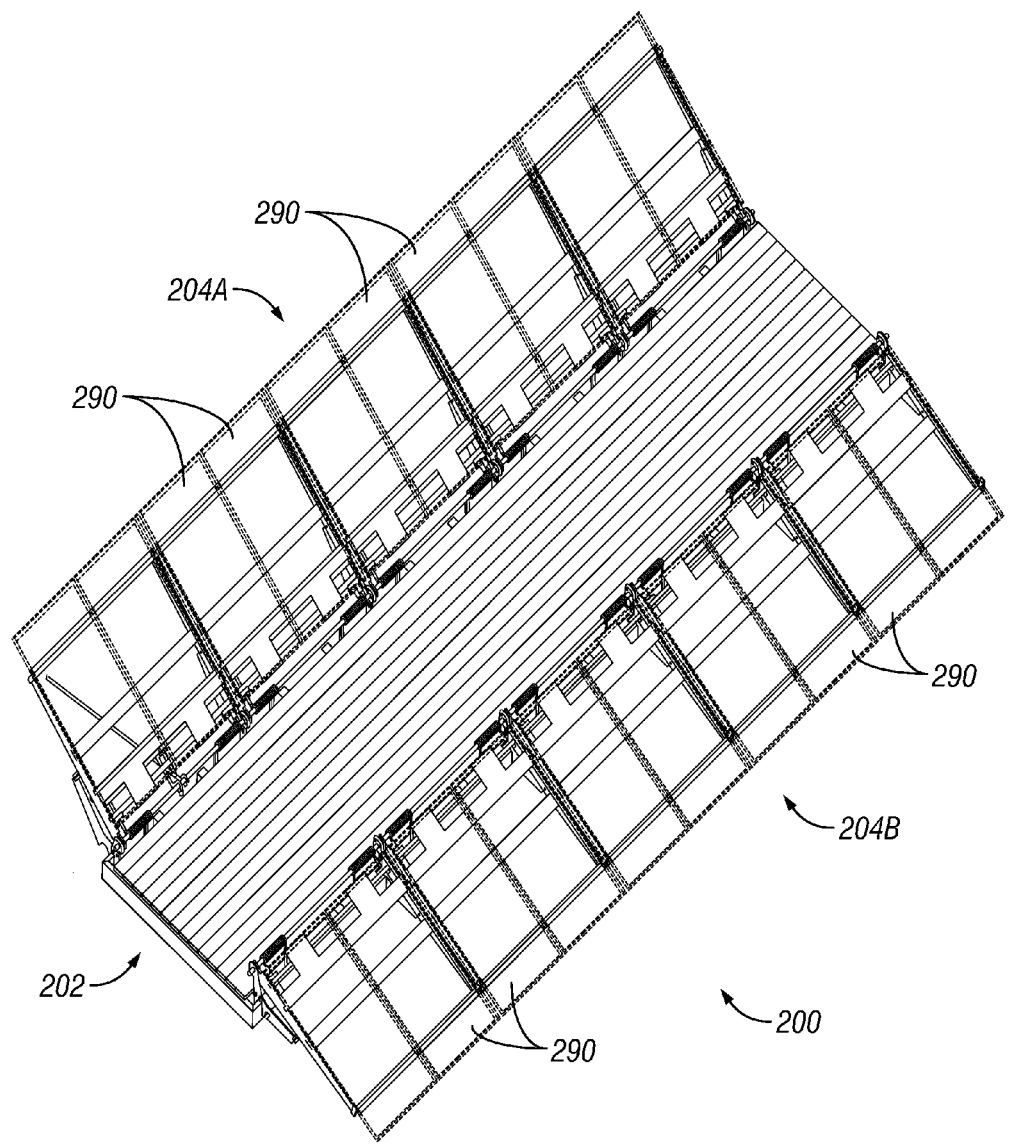
FIG. 18 shows a perspective view of the assembly in the deployed position in accordance with one or more embodiments of the present disclosure.
Figure 19:
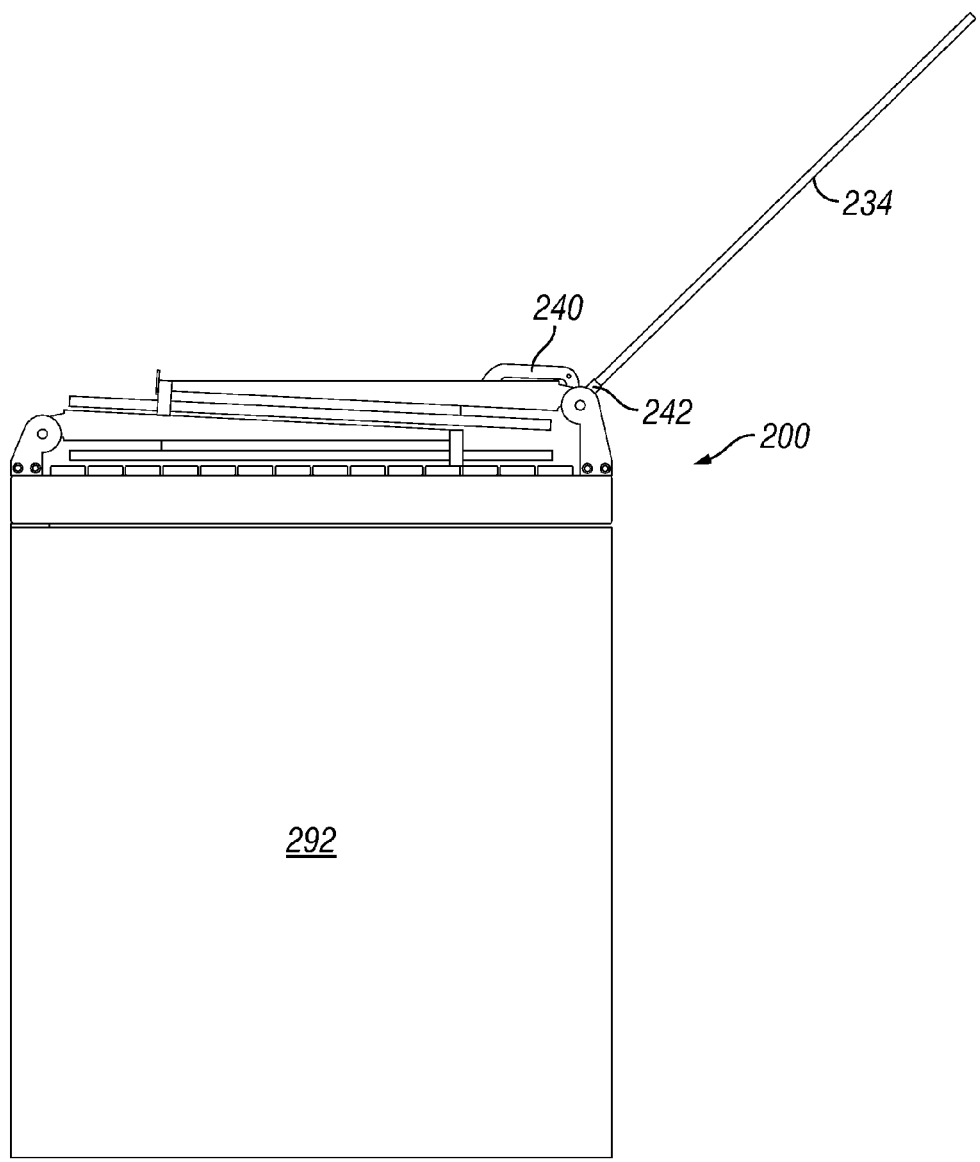
FIG. 19 shows a lateral view of the assembly on the modular structure in the folded position in accordance with one or more embodiments of the present disclosure.
Figure 20:
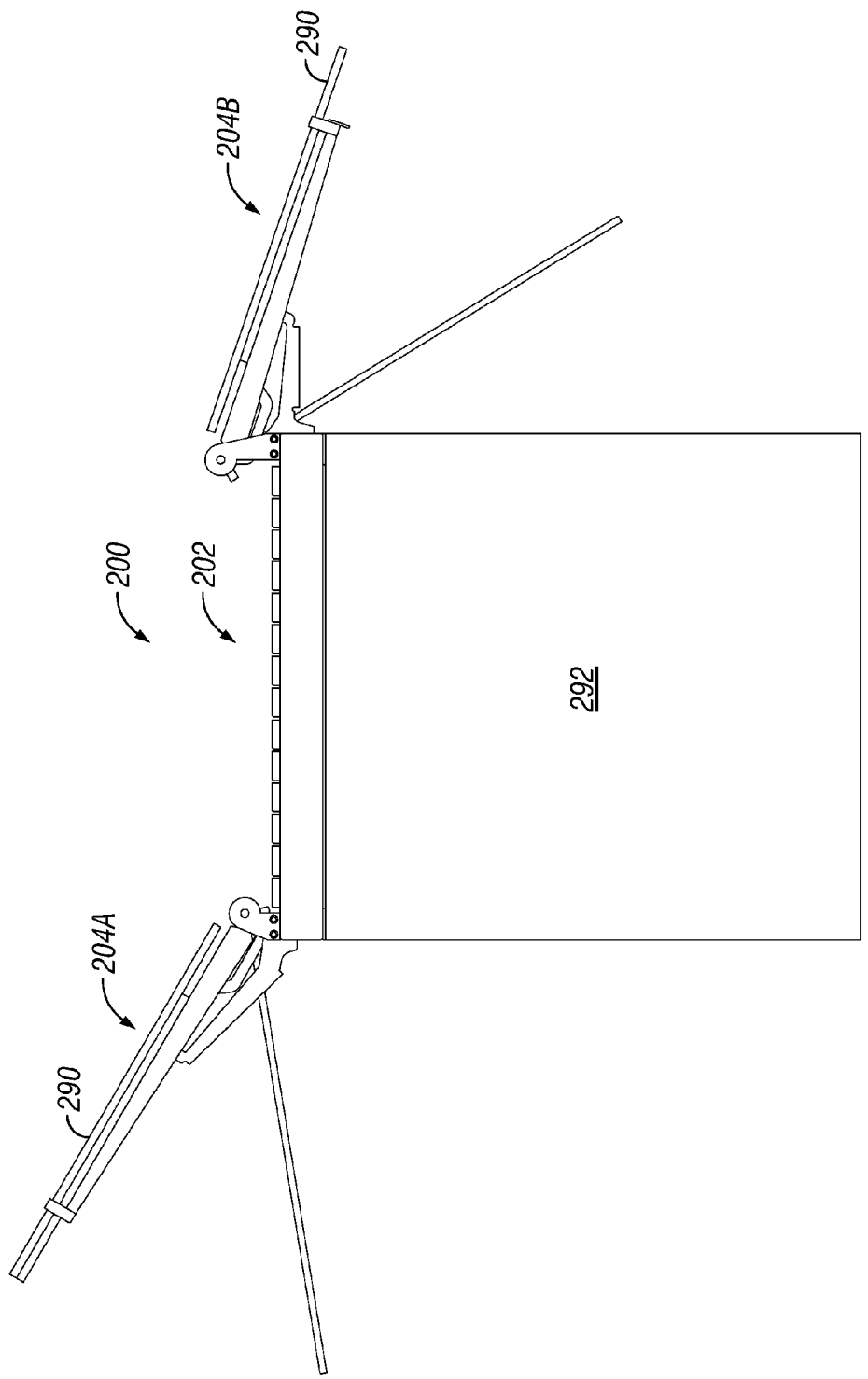
FIG. 20 shows a lateral view of the assembly on the modular structure in the deployed position in accordance with one or more embodiments of the present disclosure.
Figure 21:
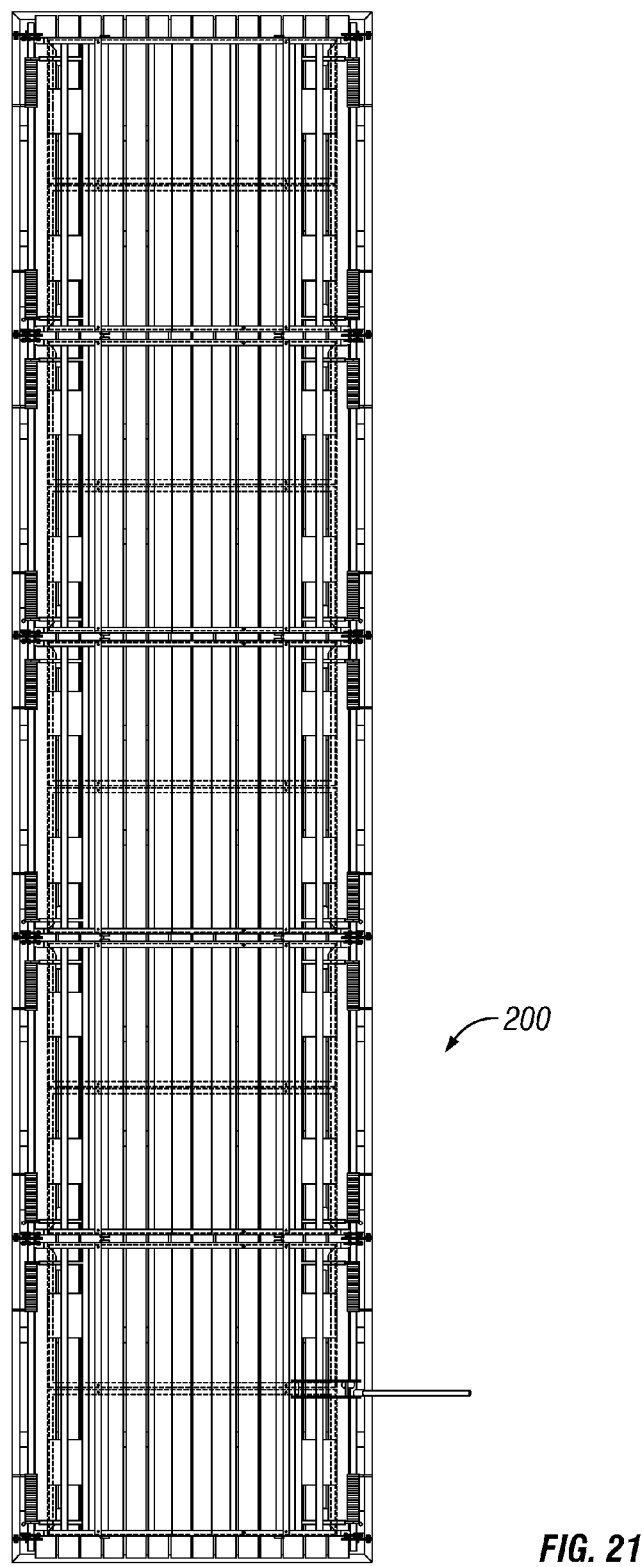
FIG. 21 shows an above view of the assembly on the modular structure in the folded position in accordance with one or more embodiments of the present disclosure.
Figure 22:
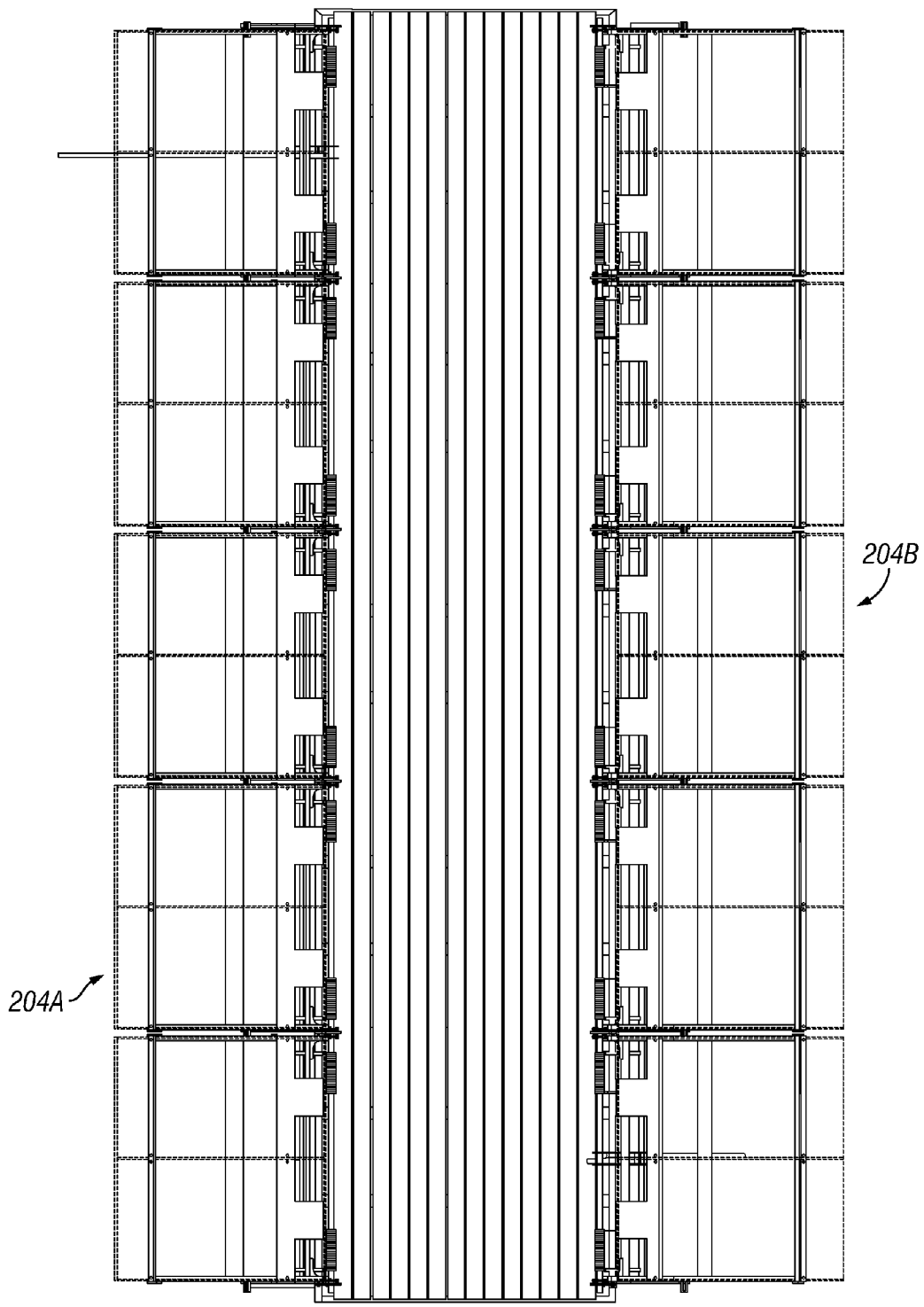
FIG. 22 shows an above view of the assembly on the modular structure in the deployed position in accordance with one or more embodiments of the present disclosure.
Figure 23:
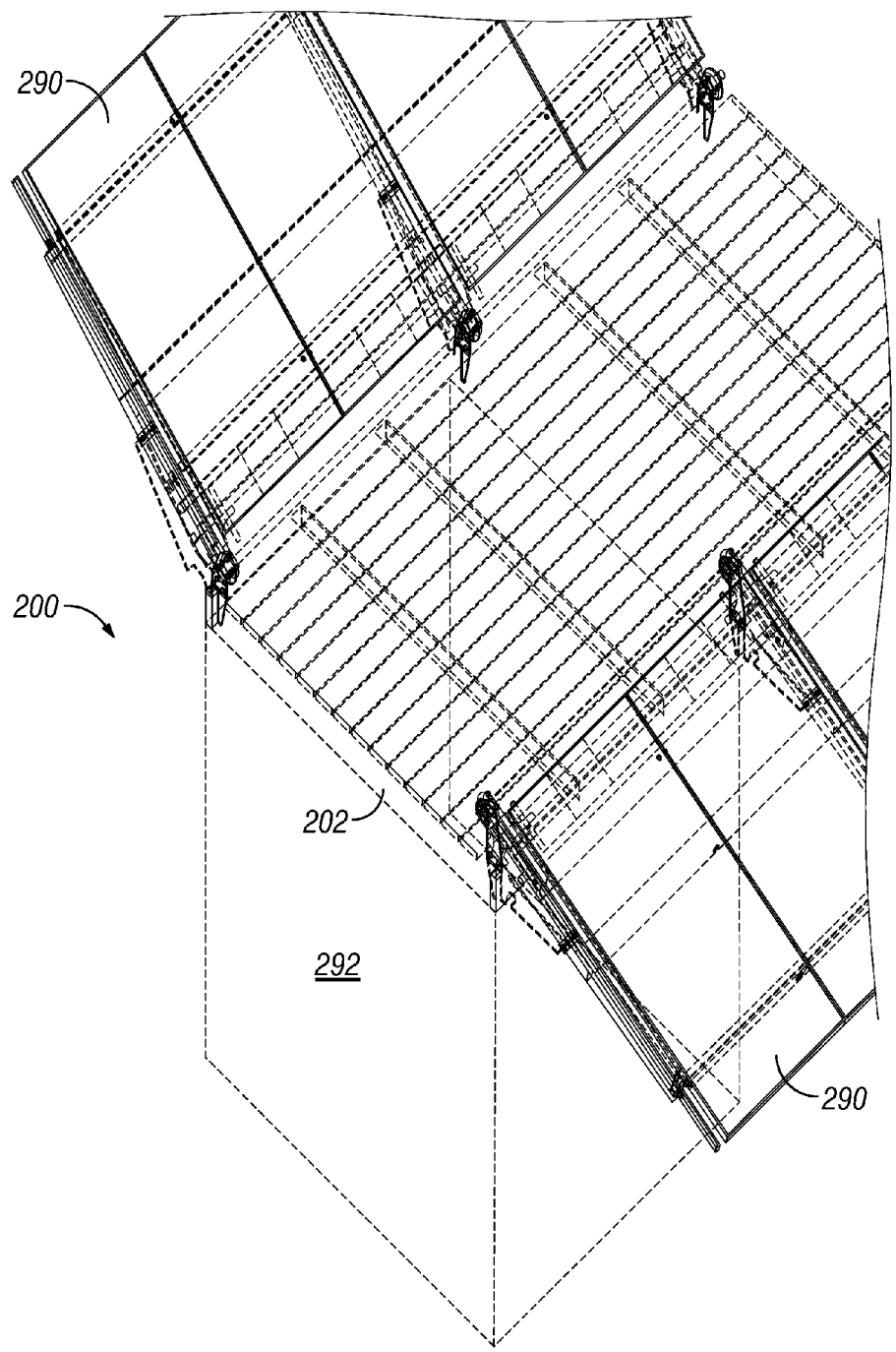
FIG. 23 shows a cutaway view of the assembly in the deployed position in accordance with one or more embodiments of the present disclosure.
Figure 24:
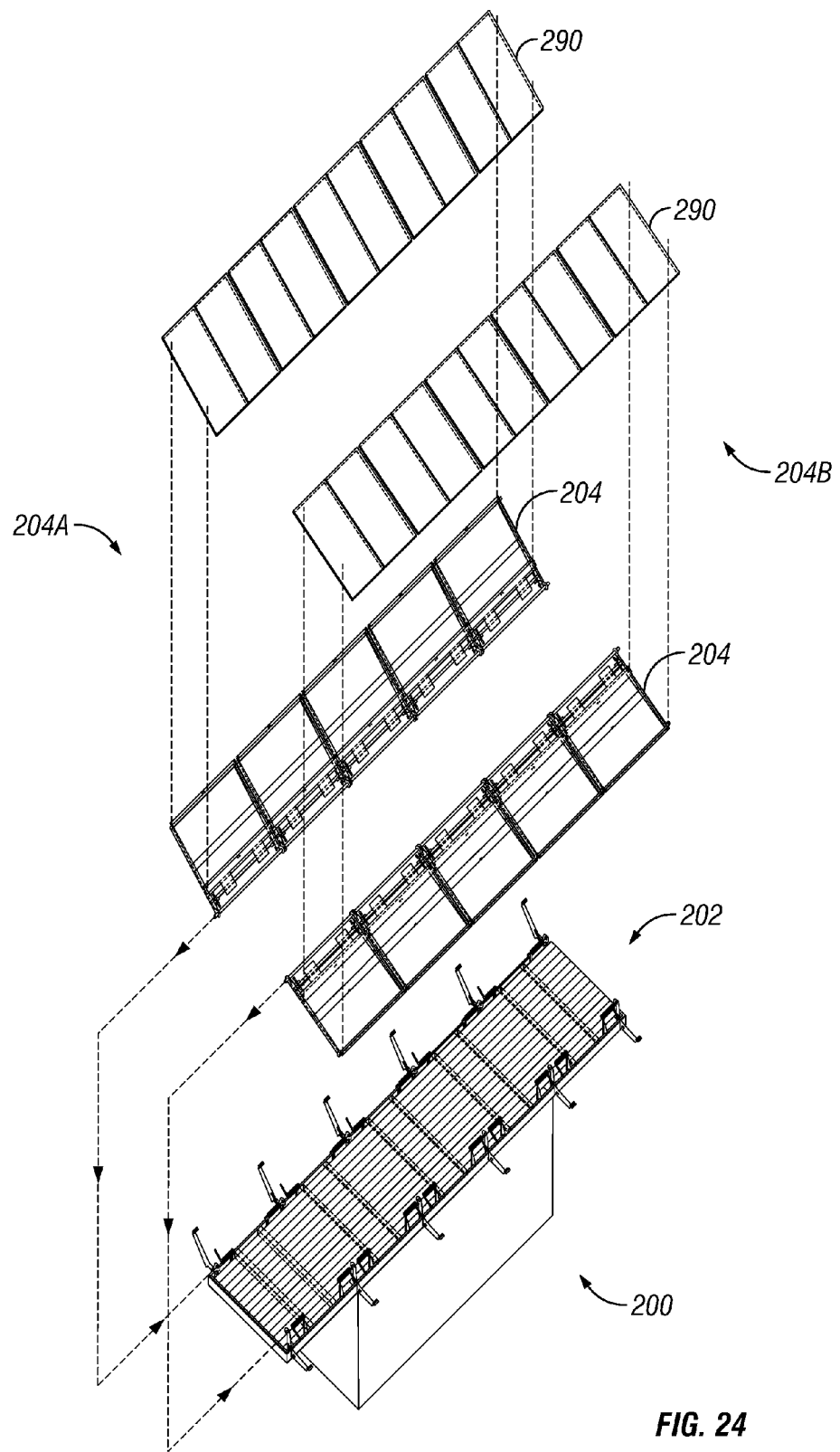
FIG. 24 shows an exploded view of the assembly in accordance with one or more embodiments of the present disclosure.
Figure 25:
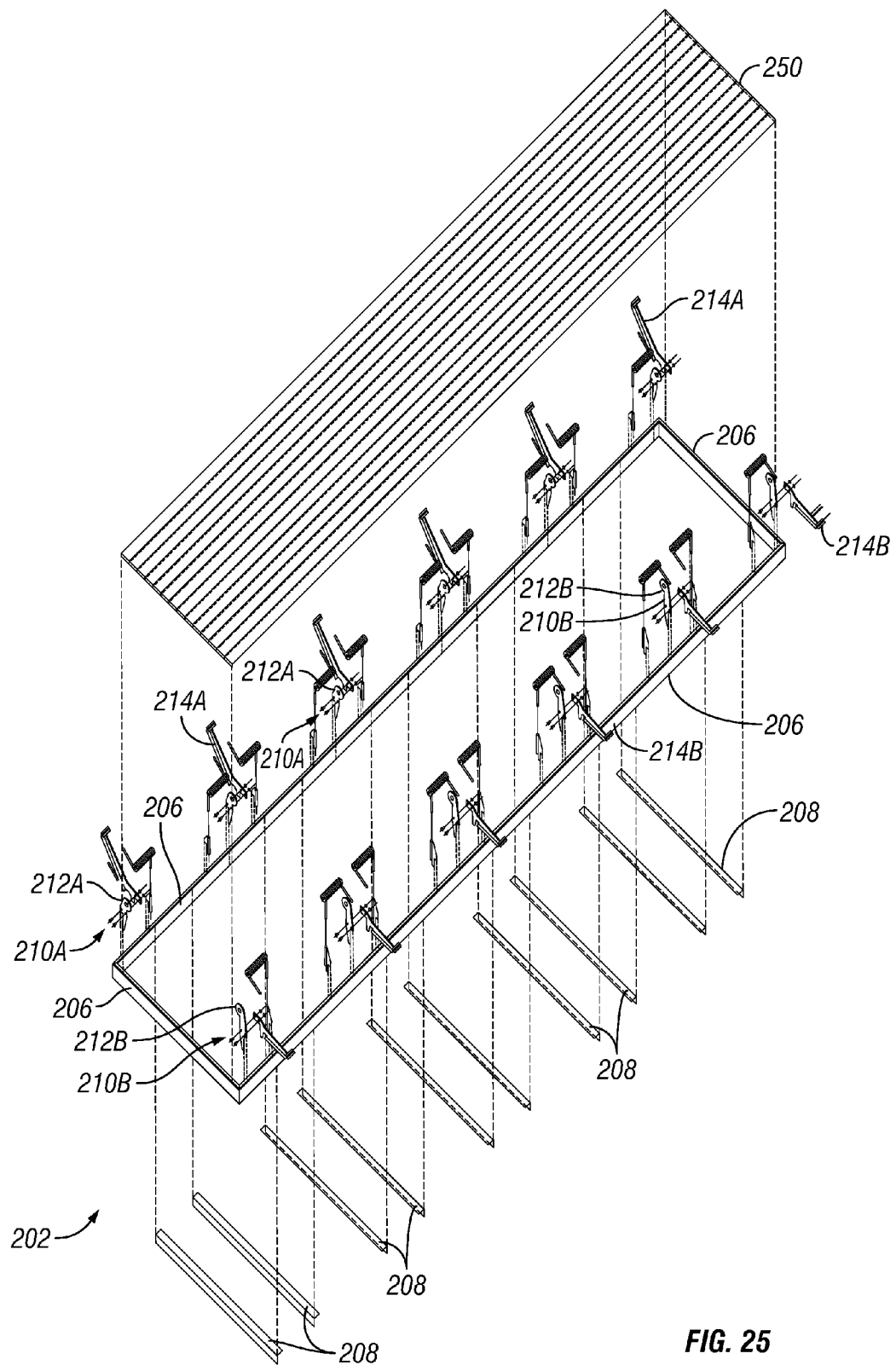
FIG. 25 shows an exploded view of a main frame of the assembly in accordance with one or more embodiments of the present disclosure.
Figure 26:
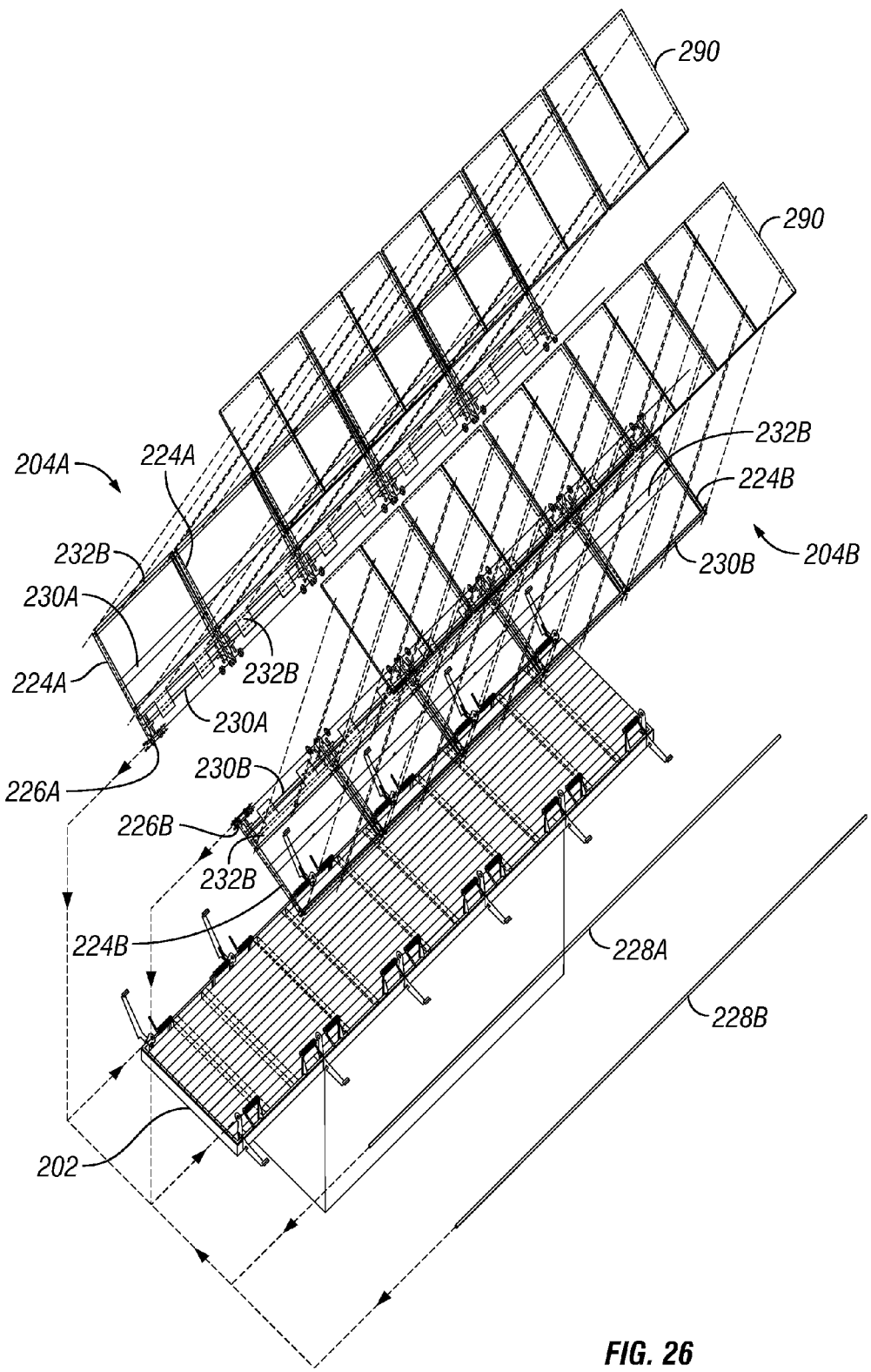
FIG. 26 shows an exploded view of a first subassembly assembly and a second subassembly connectable to the main frame of the assembly in accordance with one or more embodiments of the present disclosure.
Figure 27A:
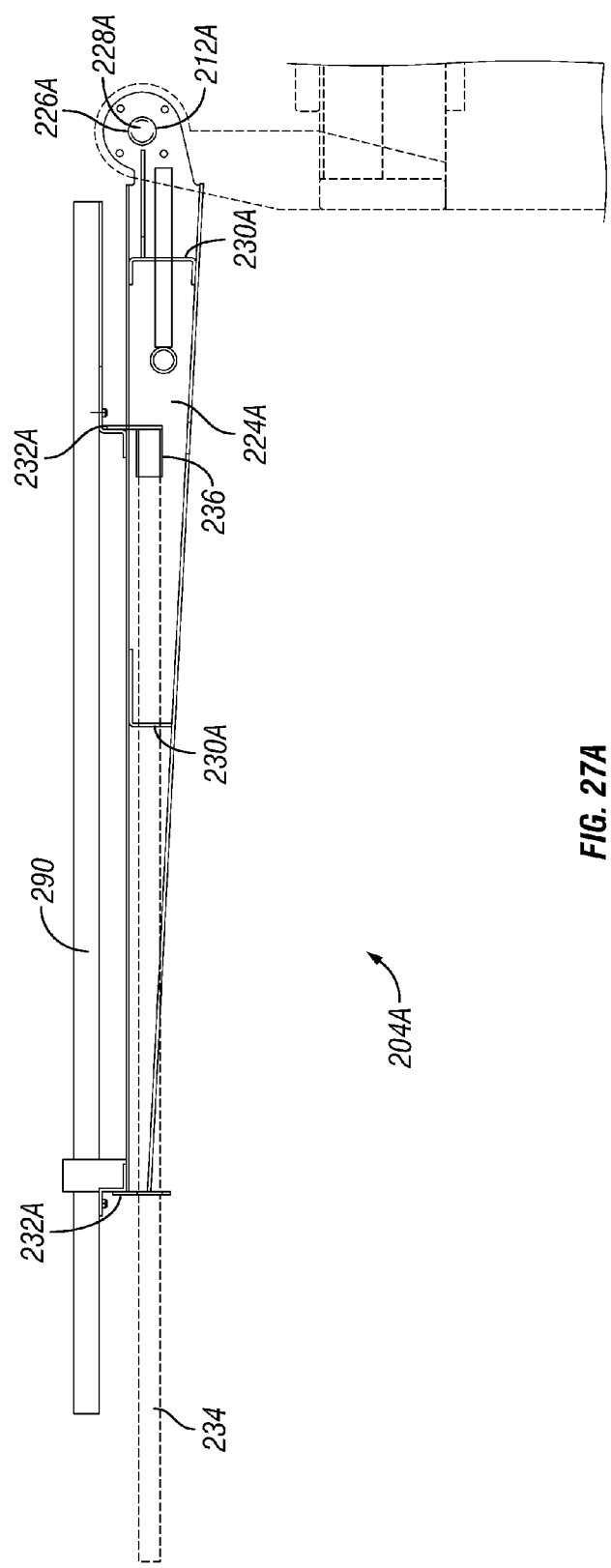
FIGS. 27A and 27B show a side cross-sectional view of the assembly in the deployed position in accordance with one or more embodiments of the present disclosure.
Figure 27B:
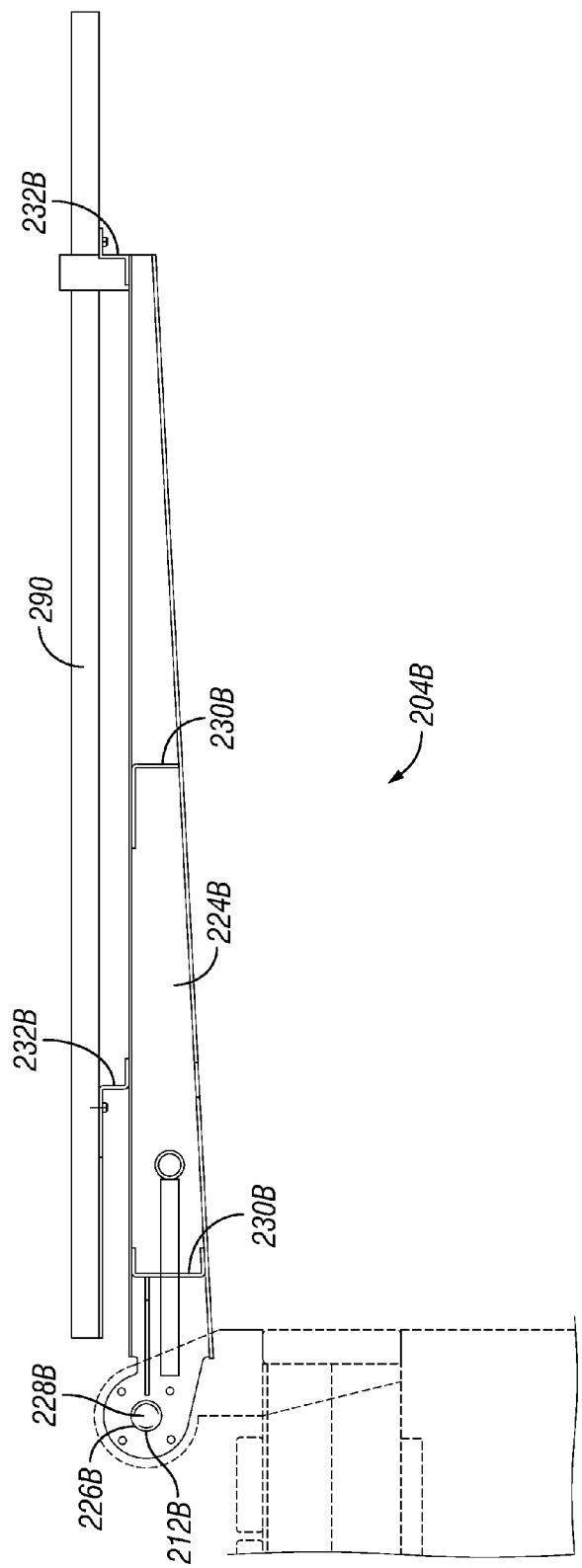

Accordingly, FIG. 15 shows a perspective view of the assembly 200 in a folded position, and FIG. 16 shows a perspective view of the assembly 200 in a deployed position. FIG. 17 shows a perspective view of the assembly 200 on the modular structure 292 in the folded position, and FIG. 18 shows a perspective view of the assembly 200 in the deployed position. FIG. 19 shows a lateral view of the assembly 200 on the modular structure 292 in the folded position, and FIG. 20 shows a lateral view of the assembly 200 on the modular structure 292 in the deployed position. FIG. 21 shows an above view of the assembly 200 on the modular structure 292 in the folded position, and FIG. 22 shows an above view of the assembly 200 on the modular structure 292 in the deployed position. FIG. 23 shows a cutaway view of the assembly 200 in the deployed position, and FIG. 24 shows an exploded view of the assembly 200. FIG. 25 shows an exploded view of the main frame 102 of the assembly 100, and FIG. 26 shows an exploded view of the first subassembly assembly 204A and the second subassembly 204B (e.g., exterior subassemblies) connectable to the main frame 202 of the assembly 200. FIGS. 27A and 27B show a side cross-sectional view of the assembly 200 in the deployed position. Further, FIGS. 28A and 28B show lateral and longitudinal views of a lever attachment mechanism 240 for use with a lever 234 or lever arm in accordance with one or more embodiments of the present disclosure.

Accordingly, as shown specifically in FIG. 25, the assembly may include a main frame 202, in which the main frame 202 may include multiple side support members 206 that may be connected to each other. Further, one or more cross support members 208 may extend between and/or be connected between the side support members 206, such as extending between the longitudinal side support members 206. In this embodiment, ten cross support members 208 are shown as extended and/or connected between the longitudinal side support members 206. In this embodiment, a weather screen 250 may be extended across the main frame 202, such as extended across the lateral side support members 208.

One or more subassembly support members 210 may then be connected to the main frame 202. In FIG. 11, the main frame 202 may include one or more first subassembly support members 210A, such as to rotatably connect the first subassembly 204A thereto, and/or may include one or more second subassembly support members 210B, such as to rotatably connect the second subassembly 204B thereto. The first subassembly support members 210A may be connected to a side support member 206, such as inserted into a slot formed within the one longitudinal side support member 206. Each of the first subassembly support members 210A may then include a hole 212A formed therethrough to rotatably connect the first subassembly 204A to the main frame 202. Further, the second subassembly support members 210B may be connected to a side support member 206, such as inserted into a slot formed within another longitudinal side support member 206. Each of the second subassembly support members 210B may then include a hole 212B formed therethrough to rotatably connect the second subassembly 204B to the main frame 202.

As shown in this embodiment, one or more of the second subassembly support members 210B may be longer, extend further from the main frame 202, and/or be further connected to the respective subassembly 204 than one or more of the first subassembly support members 210A. This arrangement may enable the connection of the second subassembly 204B with the main frame 202 to sit higher from and/or extend further away from the main frame 202 than the connection of the first subassembly 204B with the main frame 202, thereby enabling a consolidated arrangement for the assembly 200 including two subassemblies 204A and 204B when in the folded position.

One or more stop arms 214 may be connected to the main frame 202. As shown in the figures, the main frame 202 may include one or more first stop-arms 214A, such as each first stop-arm 214A connected (e.g., removably connected) to a first subassembly support member 210A and/or inserted within a slot formed within a longitudinal side support member 206. The first stop-arms 214A may then be used to support the first subassembly 204A when deployed (e.g., in the deployed position). Further, the main frame 202 may include one or more second stop-arms 214B, such as each second stop-arm 214B connected (e.g., removably connected) to a second subassembly support member 210B and/or inserted within a slot formed within a longitudinal side support member 206. The second stop-arms 214B may then be used to support the second subassembly 204B when deployed (e.g., in the deployed position).

Referring now to FIGS. 26, 27A, and 27B, exploded and detailed views of the first subassembly 204A and the second subassembly 204B in accordance with one or more embodiments of the present disclosure are shown. The subassemblies 204A and 204B may each include one or more arms and support members. As such, the first subassembly 204A may include one or more arms 224A, each including a hole 226A formed therein, that rotatably connect to the main frame 202. In particular, each of the holes 226A of the arms 224A may be aligned with a respective hole 212A of the first subassembly support members 210A with a rod 228A or axle inserted through the holes 212A and 226A to rotatably connect the first subassembly 204A to the main frame 202. Further, the first subassembly 204A may include one or more cross support members 230A extending and/or connected between the arms 224A to connect the arms 224A to each other, and/or may include one or more panel support members 232A extending and/or connected between the arms 224A to support one or more photovoltaic panels 290 on the first subassembly 204A.

Further, the second subassembly 204B may include one or more arms 224B, each including a hole 226B formed therein, that rotatably connect to the main frame 202. In particular, each of the holes 226B of the arms 224B may be aligned with a respective hole 212B of the second subassembly support members 210B with a rod 228B or axle inserted through the holes 212B and 226B to rotatably connect the second subassembly 204B to the main frame 202. Further, the second subassembly 204B may include one or more cross support members 230B extending and/or connected between the arms 224B to connect the arms 224B to each other, and/or may include one or more panel support members 232B extending and/or connected between the arms 224B to support one or more photovoltaic panels 290 on the second subassembly 204B.

As discussed above, in one or more embodiments, the assembly 200 may include one or more levers 234 or lever bars, such as to facilitate moving one or more of the subassemblies 204 between the folded position and the deployed position. Accordingly, as shown in detail in FIGS. 28A and 28B, a lever attachment mechanism 240 may be connected to the assembly 200, such as connected (e.g., removably connected) to one or more of the subassemblies 204. The lever attachment mechanism 240 may include one or more sockets 242 to receive an end of the lever 234. With respect to the first subassembly 204A and/or the second subassembly 204B, the lever attachment mechanism 240 may be able to clamp to and/or between a subassembly 204 and a rod 226 to assist and facilitate rotating the subassembly 204 with respect to the main frame 202 when deploying the subassembly 204.

In one or more embodiments, one or more of the subassemblies may be biased to assist and facilitate movement of the subassemblies. The subassemblies may be biased away from the folded position and/or away from the deployed position. Additionally or alternatively, the subassemblies may be biased to a central position between the folded position and the deployed position. For example, with respect to FIG. 17, one or more biasing mechanisms 252, such as torsion springs, may be used to bias the subassemblies 204. One or more biasing mechanisms 252A may be positioned between the first subassembly 204A and the main frame 202 to bias the first subassembly 204A, and one or more biasing mechanisms 252B may be positioned between the second subassembly 204B and the main frame 202 to bias the second subassembly 204B. In particular, a biasing mechanism 252B may be positioned about the rod 226B with one end of the biasing mechanism 252B connected to or inserted within a hole connected to the second subassembly 204B and another end of the biasing mechanism 252B connected to or inserted within a hole connected to the main frame 202. A biasing mechanism 252A for biasing the first subassembly 204A may then be similarly situated.

As shown in one or more of the above embodiments, a first subassembly may be rotatable by less than about 180 degrees between the folded position and the deployed position with respect to the main frame, and the second subassembly may be rotatable by more than about 180 degrees between the folded position and the deployed position with respect to the main frame. However, the present disclosure is not so limited, as each subassembly may be rotatable to any position and/or degree angle with respect to the main frame. For example, the efficiency of solar energy absorbed by a photovoltaic panel may be dependent upon numerous factors, in particular an angle or height of the sun with respect to the photovoltaic panel. Accordingly, the present disclosure contemplates embodiments in which the angle at which the subassemblies deploy may be adjusted.

Accordingly, in one or more embodiments, one or more of the stop-arms may be adjustable and/or adjustable connected to the main frame. This may enable an angle at which the subassembly supported by the stop-arm is then also adjustable with respect to the main frame. As described above with respect to adjusting a width of the main frame, similar concepts may also be applied for designing a stop-arm to be adjustable. For example, a stop-arm may be formed from multiple components or segments, with the segments then adjustable with respect to each other. Additionally or alternatively, the connections between the stop-arm and the main frame, and/or the stop-arm and the subassembly may be adjustable, such as by including multiple sets of holes that may be selected and adjusted for connection, as desired.

An embodiment in accordance with the present disclosure may have the surface area required to produce enough solar power for use within multiple applications, such as powering and housing telecommunications equipment in a climate controlled area, and may be capable of serving the needs mentioned in the one or more industries described above. This assembly may be light weight and rapidly deployable, saving end users the necessity for specialized loading equipment and time.

A folding photovoltaic array mounting rack assembly and modular building in accordance with the present disclosure may improve upon current technology, such as by allowing users to more safely and efficiently ship and assemble modular buildings having solar generators that are used in conjunction with a foldable rack having one or more photovoltaic panels connected to the rack. CNC technology may be employed in one or more embodiments to assist in the cutting process, such as to assure quality control standards while reducing overall material waste. Once assembled, the foldable rack assembly may be rapidly deployable, may be engineered to endure 110 mph wind speeds, and/or may produce up to 9 kW or more on an 8 ft×20 ft building footprint (a much larger amount of energy produced per footprint than traditional racking systems and solar generators).

This improved power production may allow the assembly to be an ideal telecommunications equipment center capable of off-grid solar powered operation. In turn, this system may allow for an expansion of telecommunications service where traditional power is unavailable. This also goes for the other applications mentioned in this application.

Considered broadly, the folding mounting rack assembly for photovoltaic arrays may include a variable number of photovoltaic panels mounted to subassemblies that connect and pivot about a central axis. On the outboard side of the assembly may be one or more stop-arms that may prevent the mounting array from rotating past a predefined angle of incidence with respect to the sun. The stop-arms may be fixed with machine screws to the underside of the armature subassemblies to lock the subassemblies and/or panels into position and resist uplift. In the event of inclement weather or if the panels need to be transported, the machine screws at each stop-arm can be removed. The stop-arms may be adjustable such that the angle of incidence that one or more of the panels is disposed at with respect to the sun may be adjusted, as desired. For example, in one embodiment, an angle of incidence of one panel, and/or more than one panel, may be adjusted to improve the efficiency of the photovoltaic panels. One or more biasing mechanisms may be disposed used to provide assistance when deploying one or more panels between the deployed and folded positions. Levers may also be used with one or more of the panels and/or subassemblies to assist in movement between the deployed and folded positions. Furthermore, included in the assembly may be a series of tie downs and assistance bars for locking the folded photovoltaic rack into a locked position for transportation upon assembly completion.

This assembly may include a modular building or structure, such as an ISO shipping container, for housing the rack assembly during long transportation and/or for providing structure for the rack assembly. The interior of the assembled system may be insulated to reduce heat and may be conditioned to meet the needs of telecommunications, medical, and materials treatment equipment, as desired. Fully assembled, the system is capable of both on and off-grid functionality with power storage.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. An assembly for positioning photovoltaic panels on a structure, comprising:
   a main frame configured to connect to and be solely supported by a top side of the structure;
   a first subassembly configured to solely connect to a side of the main frame with a first photovoltaic panel non-rotatably supported by the first subassembly, the first subassembly configured to rotate with respect to the main frame to place the first subassembly in a deployed position;
   a first stop-arm configured to be fixed to the main frame and establish the deployed position for the first subassembly such that the first subassembly extends out from the side of the main frame when in the deployed position;
   a second subassembly configured to solely connect to another side of the main frame with a second photovoltaic panel non-rotatably supported by the second subassembly, the second subassembly configured to rotate with respect to the main frame to place the second subassembly in a second deployed position;

a second stop-arm configured to be fixed to the main frame and establish the second deployed position for the second subassembly such that the second subassembly extends out from the other side of the main frame when in the second deployed position; and a third subassembly configured to solely connect to the main frame between the first subassembly and the second subassembly to support a third photovoltaic panel.

2. The assembly of claim 1, wherein the main frame comprises:

a first subassembly support member with the first subassembly rotatably connected to the first subassembly support member and the first stop-arm configured to connect to the first subassembly support member; and a second subassembly support member with the second subassembly rotatably connected to the second subassembly support member and the second stop-arm configured to connect to the second subassembly support member.

3. The assembly of claim 2, wherein the first subassembly support member extends upwardly further from the main frame than the second subassembly support member.

4. The assembly of claim 1, wherein the first stop-arm is configured to adjustably connect to the main frame such that an angle of the first subassembly when in the deployed position is adjustable with respect to the main frame, and wherein the second stop-arm is configured to adjustably connect to the main frame such that an angle of the second subassembly when in the second deployed position is adjustable with respect to the main frame.

5. The assembly of claim 1, wherein the third subassembly is configured to rotate with respect to the main frame to place the third subassembly in a third deployed position.

6. The assembly of claim 5, further comprising:

an actuator to rotate the third subassembly with respect to the main frame.

7. The assembly of claim 6, wherein the actuator comprises a first actuator and a second actuator connected between the main frame and the third subassembly to rotate and adjust a height of the third subassembly between an undeployed position and the third deployed position.

8. The assembly of claim 1, wherein a width of the main frame is substantially the same as a width of the structure.

9. The assembly of claim 1, wherein the first subassembly is configured to rotate between a folded position and the deployed position with respect to the main frame, and wherein the second subassembly is configured to rotate between a folded position and the second deployed position with respect to the main frame.

10. The assembly of claim 9, wherein the first subassembly is biased to a central position between the folded position and the deployed position, and wherein the second subassembly is biased to a central position between the folded position and the second deployed position.

11. The assembly of claim 1, further comprising:

a lever configured to removably connect to the first subassembly to assist rotating the first subassembly with respect to the main frame.

12. The assembly of claim 1, wherein the main frame comprises:

a first side support member with the first subassembly connected to the first side support member of the main frame;

a second side support member with the second subassembly connected to the second side support member of the main frame; and a cross support member extending between and connected to the first side support member and the second side support member.

13. The assembly of claim 12, wherein the cross support member is adjustable in length such that a width of the main frame is adjustable.

14. An assembly for positioning a photovoltaic panel on a structure, comprising:

a main frame configured to connect to and be solely supported by a top side of the structure;

a subassembly configured to solely connect to a side of the main frame with a photovoltaic panel non-rotatably supported by the subassembly, the subassembly rotatable with respect to the mainframe to place the subassembly in a deployed position;

a stop-arm configured to be fixed to the main frame and establish the deployed position for the subassembly such that the subassembly extends out from the side of the main frame when in the deployed position;

a second subassembly configured to solely connect to another side of the main frame with a second photovoltaic panel non-rotatably supported by the second subassembly, the second subassembly rotatable with respect to the main frame to place the second subassembly in a second deployed position; and a second stop arm configured to be fixed to the main frame and establish the second deployed position for the second subassembly such that the second subassembly extends out from the other side of the main frame when in the second deployed position.

15. The assembly of claim 14, further comprising:

a third subassembly configured to solely connect to the main frame between the first subassembly and the second subassembly to support a third photovoltaic panel.

16. The assembly of claim 14, wherein the main frame comprises:

a first side support member;

a second side support member;

a cross support member configured to extend between and configured to connect to the first side support member and the second side support member; and a subassembly support member configured to connect to the first side support member with the subassembly rotatably configured to connect to the subassembly support member and the stop-arm configured to connect to the subassembly support member.

17. The assembly of claim 14, wherein the stop-arm is configured to adjustably connect to the main frame such that an angle of the subassembly when in the deployed position is adjustable with respect to the main frame.

18. The assembly of claim 14, wherein the subassembly is configured to rotate between a folded position and the deployed position with respect to the main frame, and wherein the subassembly is biased to a central position between the folded position and the deployed position.

19. The assembly of claim 14, further comprising:

a lever configured to removably connect to the subassembly to assist rotating the subassembly with respect to the main frame; and a locking mechanism configured to removably connect between the subassembly and the main frame to prevent rotation of the subassembly with respect to the main frame.

20. A kit of parts for a mobile solar power generation system, comprising:
- a modular structure;
- a photovoltaic panel'
- a main frame configured to connect to and be solely supported by a top side of the modular structure;
- a subassembly configured to solely connect to a side of the main frame with a photovoltaic panel non-rotatably supported by the subassembly, the subassembly rotatable with respect to the mainframe to deploy the subassembly;
- a stop-arm configured to be fixed to the main frame and establish a deployed position for the subassembly such that the subassembly extends out from the side of the main frame when in the deployed position;
- a second subassembly configured to solely connect to another side of the main frame with a second photovoltaic panel non-rotatably supported by the second subassembly, the second subassembly rotatable with respect to the main frame to place the second subassembly in a second deployed position; and
- a second stop arm configured to be fixed to the main frame and establish the second deployed position for the second subassembly such that the second subassembly extends out from the other side of the main frame when in the second deployed position.

* * * * *